United States Patent [19]
Bachmann

[11] 3,805,524
[45] Apr. 23, 1974

[54] INTERNAL COMBUSTION ENGINE

[76] Inventor: William V. Bachmann, 22517 Ten Mile Rd., St. Clair Shores, Mich. 48080

[22] Filed: May 30, 1973

[21] Appl. No.: 365,161

Related U.S. Application Data

[63] Continuation of Ser. No. 116,892, Feb. 19, 1971.

[52] U.S. Cl............. 60/307, 60/317, 123/52 B, 123/51 BA, 123/193 CP, 60/13
[51] Int. Cl............................................. F01n 3/14
[58] Field of Search............ 60/307, 317, 280, 289, 60/290; 123/52 B, 51 BA, 58 C, 193 CP, 193 P

[56] References Cited
UNITED STATES PATENTS

| | | | |
|---|---|---|---|
| 3,396,535 | 8/1968 | Milos | 60/307 |
| 3,553,961 | 1/1971 | McReynolds | 60/317 |
| 1,576,837 | 3/1926 | Marr | 123/52 B |
| 1,103,681 | 7/1914 | Miller | 123/52 B |
| 2,079,289 | 5/1937 | Jänicke | 123/52 B |
| 3,570,463 | 3/1971 | Nelson | 123/58 C |

FOREIGN PATENTS OR APPLICATIONS

| | | | |
|---|---|---|---|
| 901,605 | 1/1954 | Germany | 123/52 B |

*Primary Examiner*—Carlton R. Croyle
*Assistant Examiner*—Warren Olsen
*Attorney, Agent, or Firm*—Lon H. Romanski

[57] ABSTRACT

An internal combustion engine includes an annular or ring type cylinder and reciprocating piston therein; exhaust ports from the cylinder lead to an afterburner section situated generally medially of the annular cylinder; the exhaust gases from the annular cylinder are further burned in the afterburner section and such gases as are produced by further burning in the afterburner are directed against a power turbine wheel; additional atmospheric air is pumped, as by a reciprocating air pump or compressor, to the afterburner section to enable the more complete burning of the exhaust gases within the afterburner and to control the temperature of the resulting gases passing through the power turbine wheel; the power produced by the reciprocating ring piston and turbine wheel is fed to an output shaft through a coupling power train.

46 Claims, 26 Drawing Figures

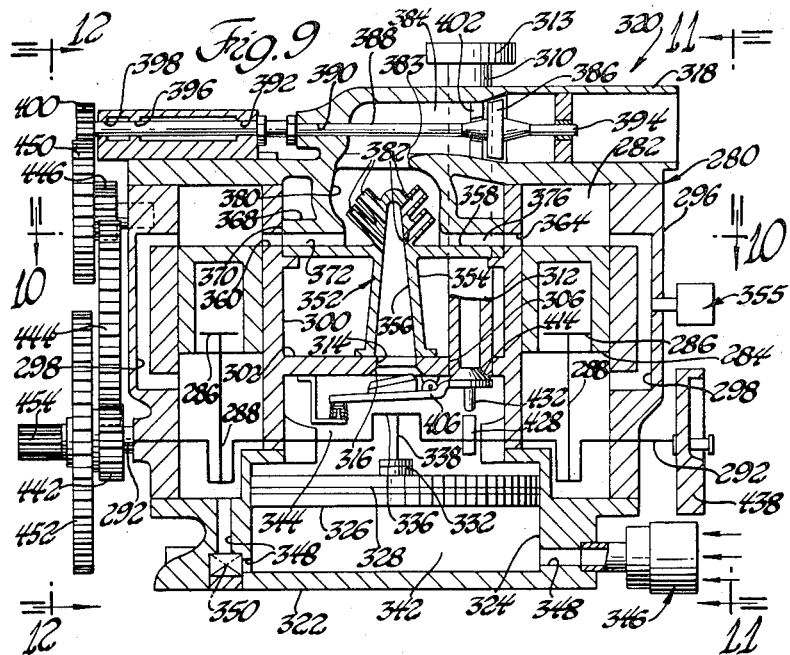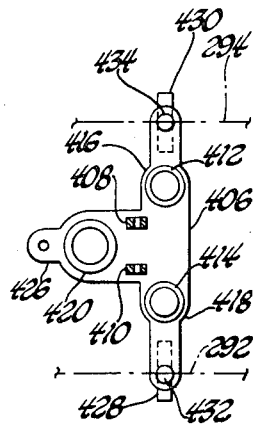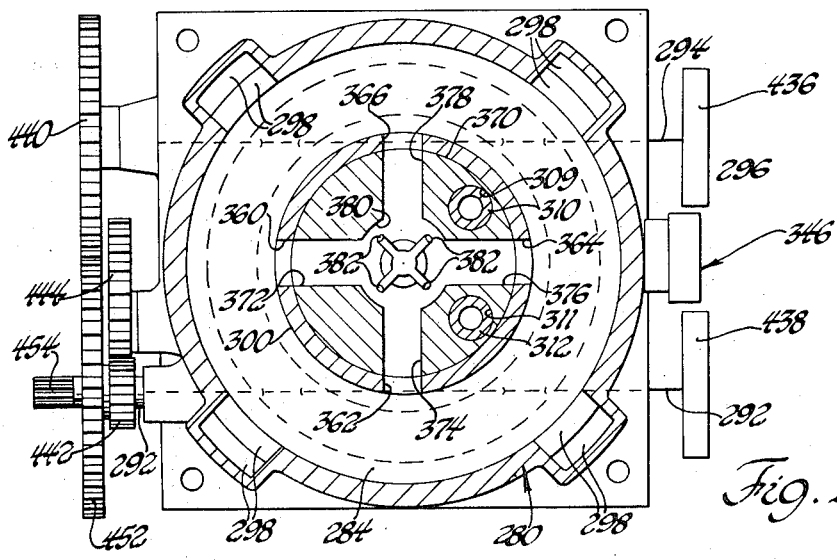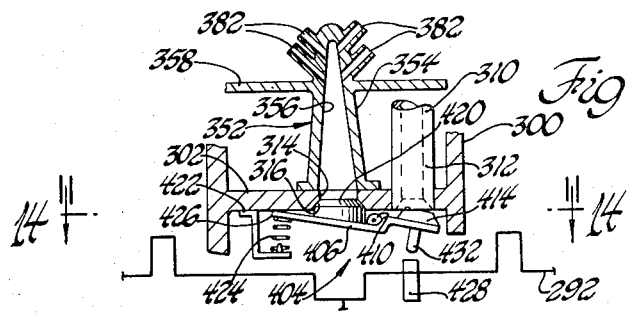

INTERNAL COMBUSTION ENGINE

This is a continuation of application Ser. No. 116,892 filed Feb. 19, 1971.

BACKGROUND OF THE INVENTION

The recent public awareness of and concern regarding air pollution has resulted in a considerable attack on the automotive engines of the prior art and the part that they play in contributing to the problem of air pollution. However, dealing with the acute air pollution problems, stemming from the great number of automobiles in operation is, to say the least, very complicated in theory as well as in practice. Heretofore, no perfect solutions have been offered. If such proposed solutions are analyzed it will be found that each proposed solution or system has more flaws than efficiency. Even combining the most desirable features of every system heretofore proposed would not achieve much more than raise the overall cost of the engine.

The basic obstacle to an efficient remedy for the air pollution produced by the automotive engines must be attributed to the peculiarities of the design principles on which such prior art engines have been engineered to obtain the present day high performance.

In the past, high performance but inexpensive engines was the general goal. However, in achieving such a goal, the inherent pollution potential of such engines was totally disregarded. Now, because of the concern with air pollution, the problem of eliminating the pollution created by such prior art engines has been added to the overall design considerations for such engines. However, it has been found that such prior art engines do not readily adapt themselves to the additional tasks (the limitation or elimination of exhaust pollutents) which they are now expected to perform. Therefore, only minor improvements have been and will be made in the future with, what is considered, unreasonable cost penalties.

A successful solution to the problem of exhaust emissions and air pollution can hardly be expected with the use of technology as is known in the prior art. For example, the following are but a few of the characteristics of the prior art internal combustion reciprocating engines which present a hinderance to arriving at a successful solution of air polluting exhaust emissions.

Today's high performance internal combustion engines are generally of the 8-cylinder, four-stroke type and have:

1. a high compression ratio, some in the order of 10:1 or over;
2. dual or four barrel carburetors;
3. A 300 to 400 cubic inch breathing volume;
4. a crank speed, at rated horsepower, of from 4,000 to 5,000 R.P.M.;
5. intake and exhaust valves (some single — some dual) which can leak;
6. mechanism intended for synchronizing the opening and closing of the intake and exhaust valves resulting in such valves having inherently built-in blow down losses which waste fuel and contribute to the pollution of the air;
7. exhaust manifolds which are always filled to capacity with piston exhaust residues which are incompletely burned gases and as such rush through the manifold at sonic speeds;
8. carburetor fuel-air mixtures leaking (or evaporating) to the ambient atmosphere;
9. unburned fuel-air mixture leaking into the interior of the engine crankcase;
10. inherent crankcase pollution with resulting varnish deposits and sludge contamination of the crankcase oil;
11. erosion of vital engine parts and exhaust muffler system by attack of lead acids arising from the combustion of leaded fuels;
12. the need for at least limited amounts of tetraethyl lead to lubricate valve seats to prevent mechanical erosion thereof;
13. heat losses through cylinder walls, cylinder heads and pistons but mostly through early exhausting of the combustion gases to the atmosphere;
14. exhaust emissions comprised of quantities of hydrocarbons, monoxide, lead, nitrous oxide and sulphur acids far too great to be tolerable;
15. a fuel to power conversion efficiency of less than 27 percent; and
16. a mechanical efficiency of not more than 85 percent.

Nearly every engine characteristic listed in the foregoing may be declared as being adverse to any corrective measure which is intended to reduce air polluting exhaust emissions of such prior engines.

Accordingly, the invention as herein disclosed and described is concerned with the elimination of such of the above characteristics as are deemed to be incompatible to an engine which is highly efficient and yet capable of producing its power without the attendant exhaust pollutents of the prior art.

SUMMARY OF THE INVENTION

Accordingly, an internal combustion engine of the invention may be said to comprise an engine housing with an annular cylinder formed therein which receives a ring piston therein for reciprocating movement, an afterburner section formed generally medially of the annular cylinder which afterburner section receives the exhaust gases from the annular cylinder and enables the further burning thereof as to at least more nearly complete combustion of such exhaust gases and thereby bring about further expansion, and a power turbine section through which such further expanded gases are directed thereby extracting therefrom additional work energy.

An object of the invention is to provide an improved internal combustion engine which inherently produces a dramatically reduced level of exhaust emissions thereby reducing its contribution to air pollution.

Another object of the invention is to provide an improved internal combustion engine which, by inherent design, provides for simpler, less frequent and less costly maintenance and servicing.

Another object of the invention is to provide an improved internal combustion engine wherein crankcase blow-by emission can, for all practical purposes, be considered eliminated.

A further object of the invention is to provide an improved internal combustion engine which can be efficiently operated on unleaded fuels.

A still further object of the invention is to provide an improved internal combustion engine which does not require the use of timed moveable inlet and exhaust valves.

Another object of the invention is to provide an improved internal combustion engine wherein the piston speed can be drastically reduced without effecting the power output thereof.

Another object of this invention is to provide an improved internal combustion engine which substantially reduces the heat loss through the cylinder walls and cylinder head and to convert such extra heat saved thereby to work output of the engine.

Other both general and specific objects and advantages of the invention will become apparent when reference is made to the following detailed description considered in conjunction with the accompanying drawings.

DESCRIPTION OF THE DRAWINGS

In the drawings, wherein for purposes of clarity certain details and elements may be omitted from one or more views;

FIG. 9 is a generally axial cross-sectional view of a second embodiment of the invention;

FIG. 10 is a cross-sectional view taken generally on the plane of line 10—10 of FIG. 9 and looking in the direction of the arrows;

FIG. 13 is a view illustrating a fragmentary portion of the structure of FIG. 9 but with certain elements thereof in a different operating position;

FIG. 14 is a fragmentary portion of certain of the elements of FIG. 13, generally shown in elevation, as seen possibly on the plane of line 14—14 of FIG. 13 and looking in the direction of the arrows;

DESCRIPTION OF THE PREFERRED EMBODIMENTS

Figure 1:
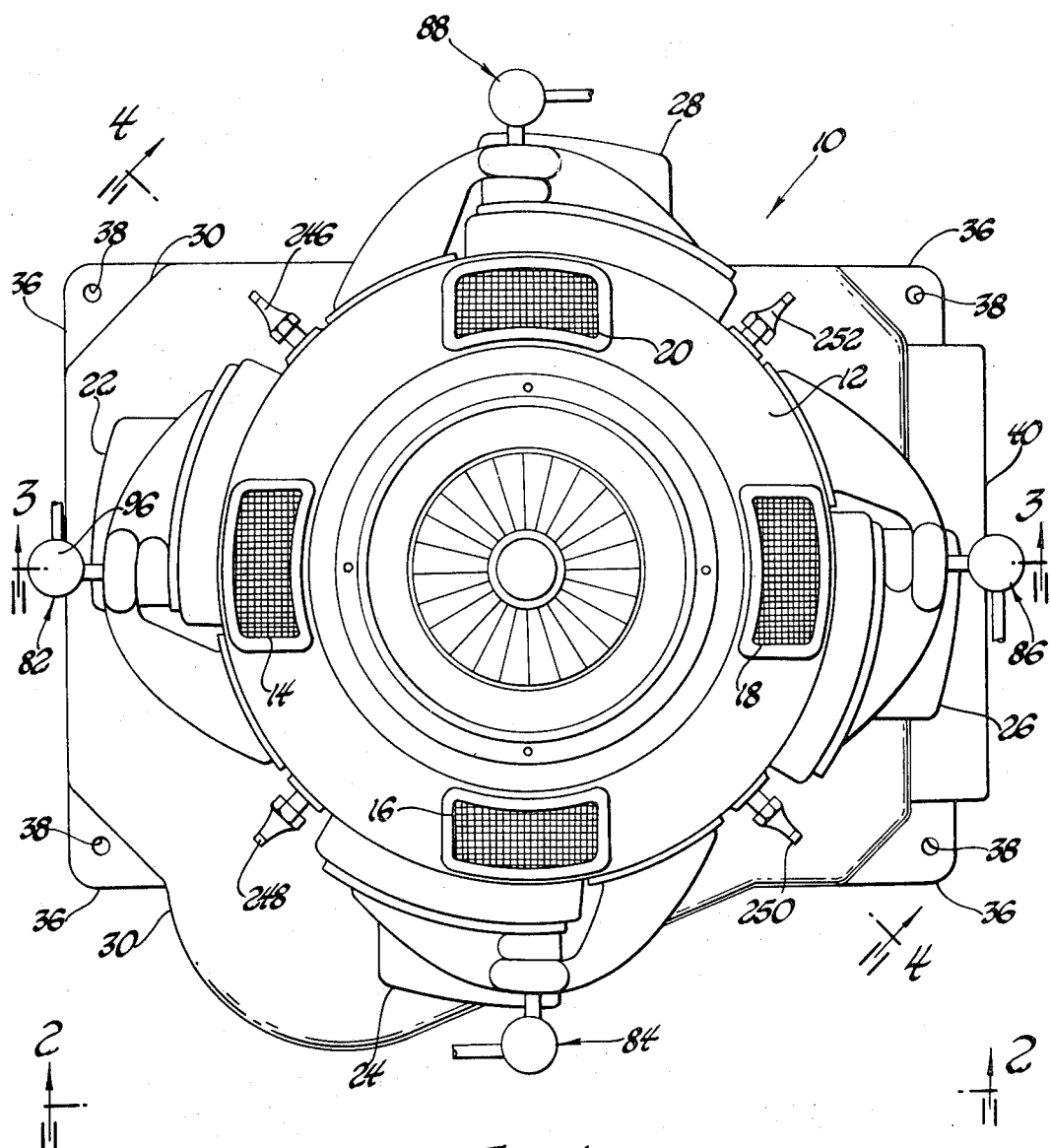
FIG. 1 is a top plan view of an internal combustion engine constructed in accordance with the teachings of the invention.
Figure 2:
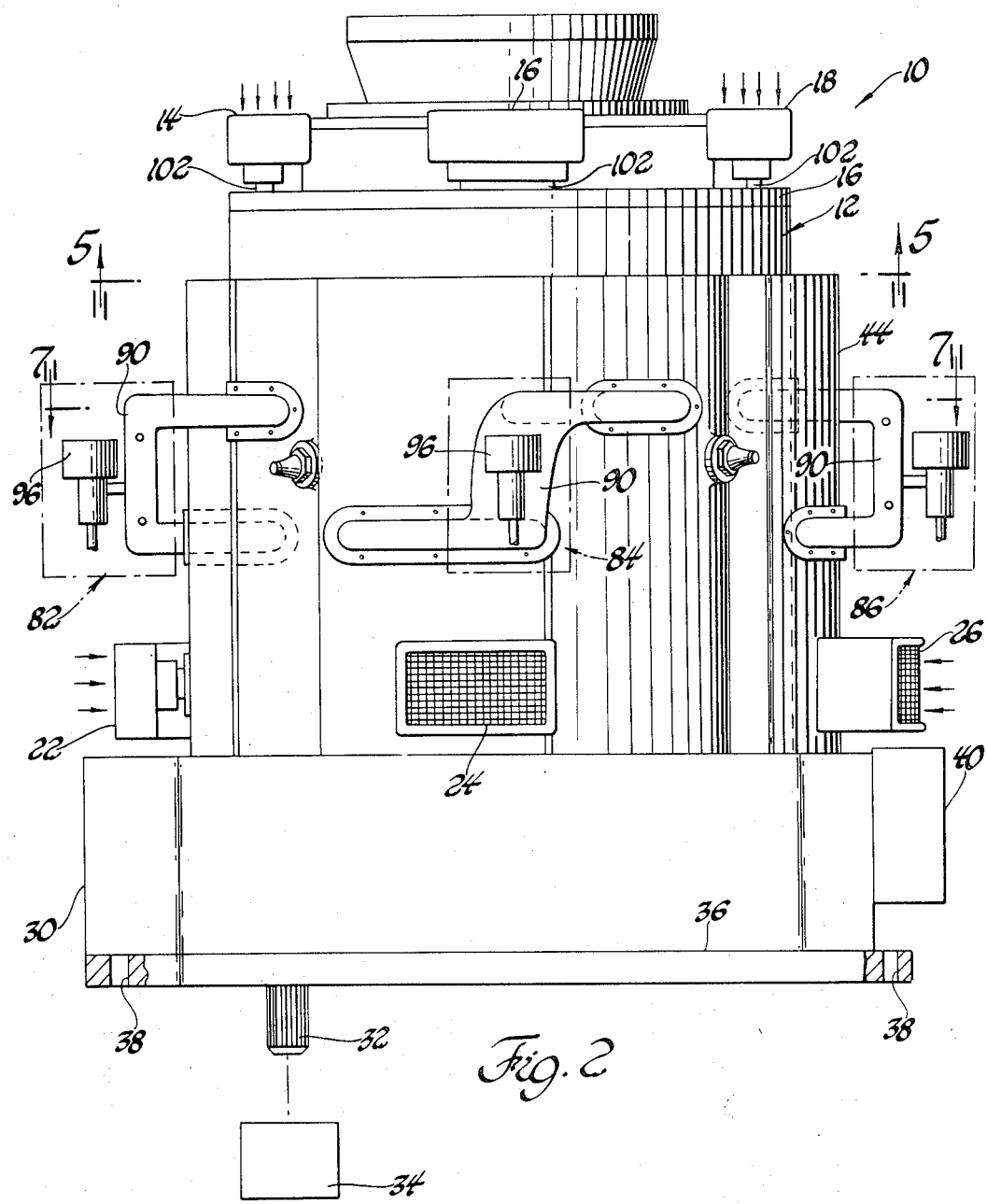
FIG. 2 is a side elevational view of the engine of FIG. 1 taken generally on the plane of line 2—2 of FIG. 1 and looking in the direction of the arrows.
Figure 3:
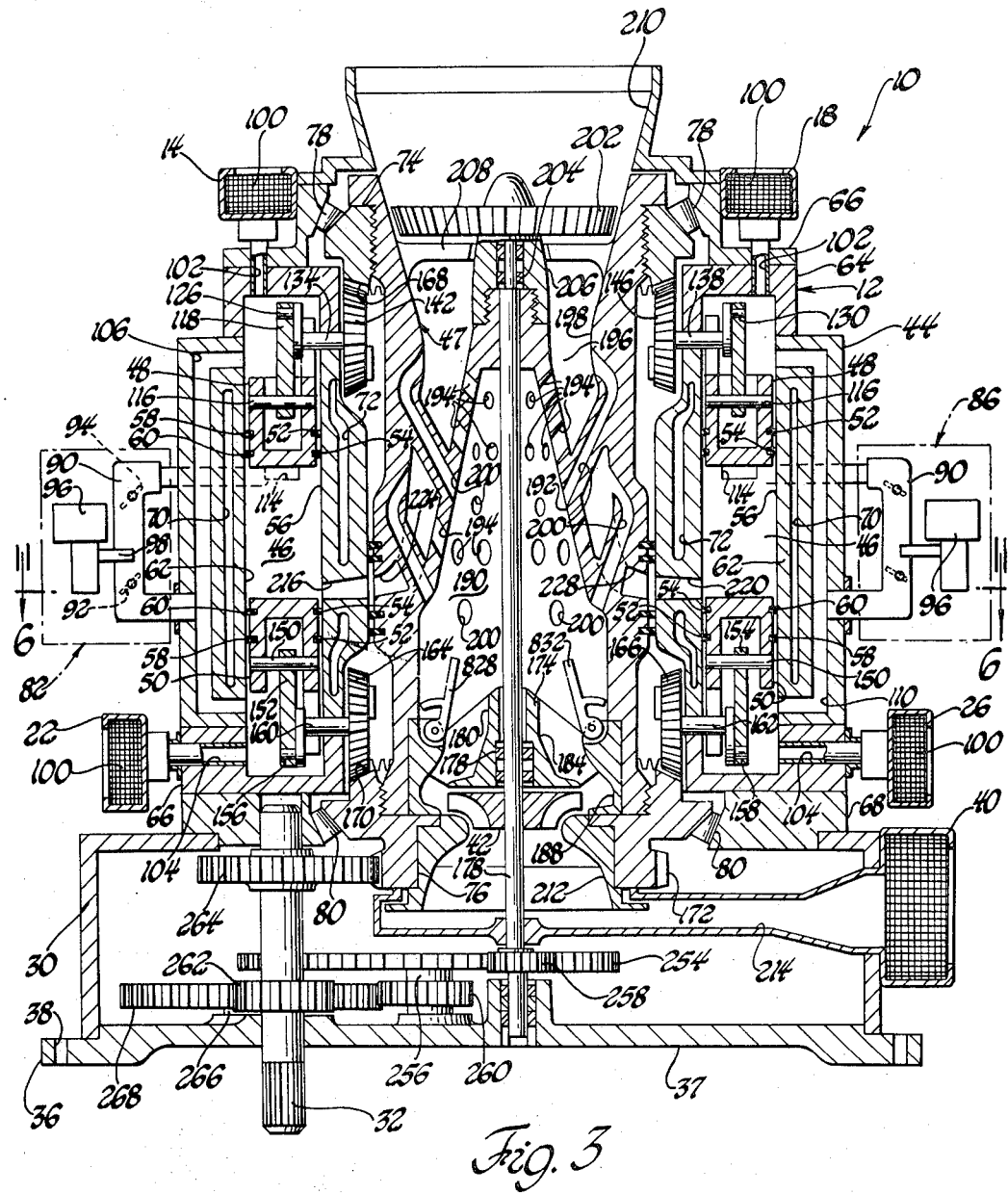
FIG. 3 is a generally axial cross-sectional view taken generally on the plane of line 3—3 of FIG. 1 and looking in the direction of the arrows.

Referring now in greater detail to FIG. 3, which is a FIGS. 1 and 2 respectively illustrate the top plan and side elevational views of an engine 10 constructed in accordance with the teachings of the invention. As illustrated, the engine 10 is comprised of an outer housing 12 provided with air intake assemblies or ports 14, 16, 18 and 20 at the top thereof and a plurality of air intake assemblies or ports 22, 24, 26 and 28 at the side thereof. The lower end of housing 12 may include a gear-box housing portion 30 from which a power output shaft 32 may extend for connection to a suitable power consuming device as, for example, the power train 34 of an associated vehicle. A flange 36, including apertures 38 formed therethrough, may be provided for purposes of mounting the engine 10 onto a related support structure. A main air intake 40, located at the lower end of the housing assembly 12, serves as the air inlet for a compressor 42 which is shown, for example, in FIG. 3.

Referring now in greater detail to FIG. 3, which is a generally axial cross-sectional view taken on the plane of line 3—3 of FIG. 1, it can be seen that the engine 10 is actually a composite engine comprised of an internal combustion piston type engine section and a turbine engine coupled to each other through suitable power transmitting means such as the gear train shown and to be described.

It can be seen that the engine housing assembly 12 is comprised of a main engine block or body 44 of a generally annular configuration so as to accommodate medially thereof a turbine engine housing 47. Engine housing 44 has an annular chamber or passage 46 formed therethrough for the reception therein of a plurality of opposed ring-like pistons 48 and 50. Preferably, both upper and lower ring pistons 48 and 50 are provided with inner ring-like piston rings 52 and 54 which slideably engage the inner surface 56 of piston chamber 46 and outer piston rings 58 and 60 which slideably engage the outer surface 62 of the piston chamber 46. The opposite ends of housing section 44 may be closed as by annular upper and lower head or capping members 64 and 66 suitably secured in position to housing 44. Upper and lower bearing support members 66 and 68, the purpose of which will be subsequently described, are also suitably secured to the overall housing assembly 12.

Housing 44 may also be provided with suitable passage means 70 and 72, may be cored or otherwise formed in any manner well known in the art, for the flow therethrough of a suitable engine coolant if such be desired.

Generally, the turbine housing 47 may be suitably secured at its opposite ends to bearing support or race members 74 and 76 which, respectively, cooperate with bearing supports 66 and 68 in rollingly containing therebetween bearings such as tapered roller bearings 78 and 80.

The engine 10 is provided with a plurality of fuel supply devices 82, 84, 86 and 88 which are generally depicted as being of the carbureting type wherein, typically, a fuel supply device may be comprised of an induction passage 90 containing therein a choke valve 92 and a throttle valve 94 with a suitable fuel reservoir 96 feeding fuel to the induction passage 90, at a metered rate flow, via suitable conduit means 98.

As typically illustrated by inlets 14 and 18, the upper air inlet assemblies, which may include suitable screens or grills 100, communicate via conduit means 102 with the upper end of piston chamber 46 while the lower inlets 22, 24, 26 and 28, as typically illustrated by inlet assemblies 22 and 26, communicate with the lower end of piston chamber 46 via conduit means 104.

Preferably, as indicated, separate passage means are formed in the housing 44 for each fuel supplying for communicating the air admitted by the upper and lower air inlet assemblies to the piston chamber 46. That is, for example, passage means 106, 108, 110 and 112 are formed as to have their respective upper ends in communication with the upper end of piston chamber 46 while their respective lower ends are in communication with the lower end of piston chamber 46. Further, as typically illustrated by, for example, fuel supply device 86 of FIG. 3, one end of the induction passage 90 is in communication with passage means 110 while the other end of the induction passage 90 is in communication with the piston chamber 46 via port 114 situated as to be at a point generally between pistons 48 and 50 when such pistons are in a position as shown.

Figure 5:
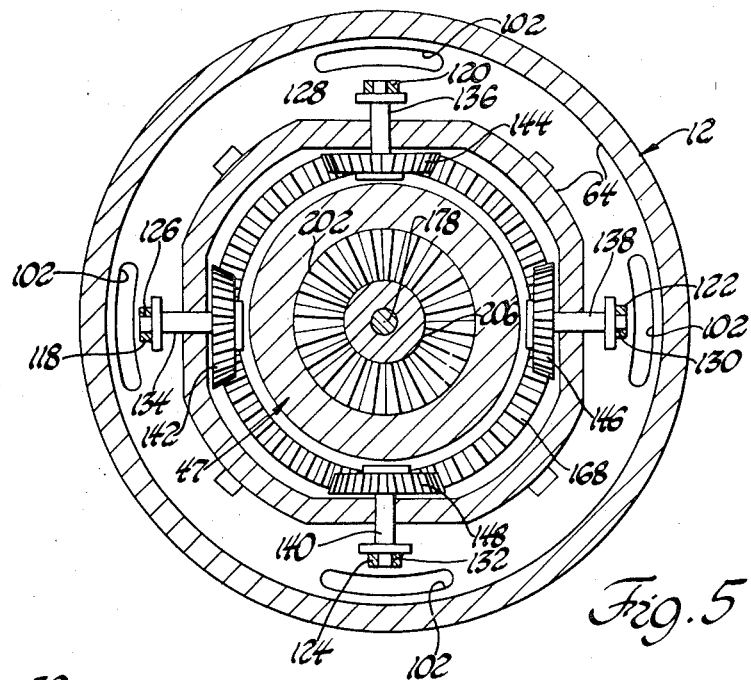
FIG. 5 is a cross-sectional view of the engine taken generally on the plane of line 5—5 of FIG. 2 and looking in the direction of the arrows.

Each of the pistons is connected as by means of a plurality of cranks to respective bevel type gears. For example, as shown in FIGS. 3 and 5, upper piston 48 has a plurality of wrist pins 116 (two of which are shown) which are respectively connected to connecting rods 118, 120, 122 and 124. The respective upper ends of such connecting rods are, in turn, connected to eccentric journals 126, 128, 130 and 132 operatively connected to shafts 134, 136, 138 and 140 of bevel gears 142, 144, 146 and 148.

Similarly, the lower piston 50 has a plurality of wrist pins 150 (two of which are shown) which are respectively connected to connecting rods 152, 154. The respective upper ends of such connecting rods are, in turn, connected to eccentric journals 156 and 158 operatively connected to shafts 160 and 162 of bevel gears 164 and 166. Although only two of the connecting rods, wrist pins, shafts and bevel gears have been shown connected to lower piston 50, it should be made clear that in the preferred embodiment of the invention the lower piston 50, as the upper piston 48 would be operatively connected to more than just such a complement of connecting rods and bevel gears in order to better distribute the loading forces incurred when the pistons are in their power strokes.

The upper bevel gears, as illustrated by gears 142 and 146, are in meshed engagement with a co-acting ring gear portion 168 which may be formed on the bearing support member 74 while the lower bevel gears, as illustrated by gears 164 and 166, are in meshed engagement with a co-acting ring gear portion 170 which, similarly, may be formed on the bearing support member 76. As can be appreciated, reciprocation of pistons 48 and 50 causes rotation of upper and lower bevel gears which in turn drivingly rotate the turbine housing 47 with the result that an output driving rotation is produced at a gear portion 172 formed as at the lower end of bearing support 76. Accordingly, it can be seen that in the first embodiment of the invention, the turbine housing 47 serves dual functions, that being, the function of a housing for the components comprising the turbine engine section and the function of a motion and power transmitting member.

Figure 6:
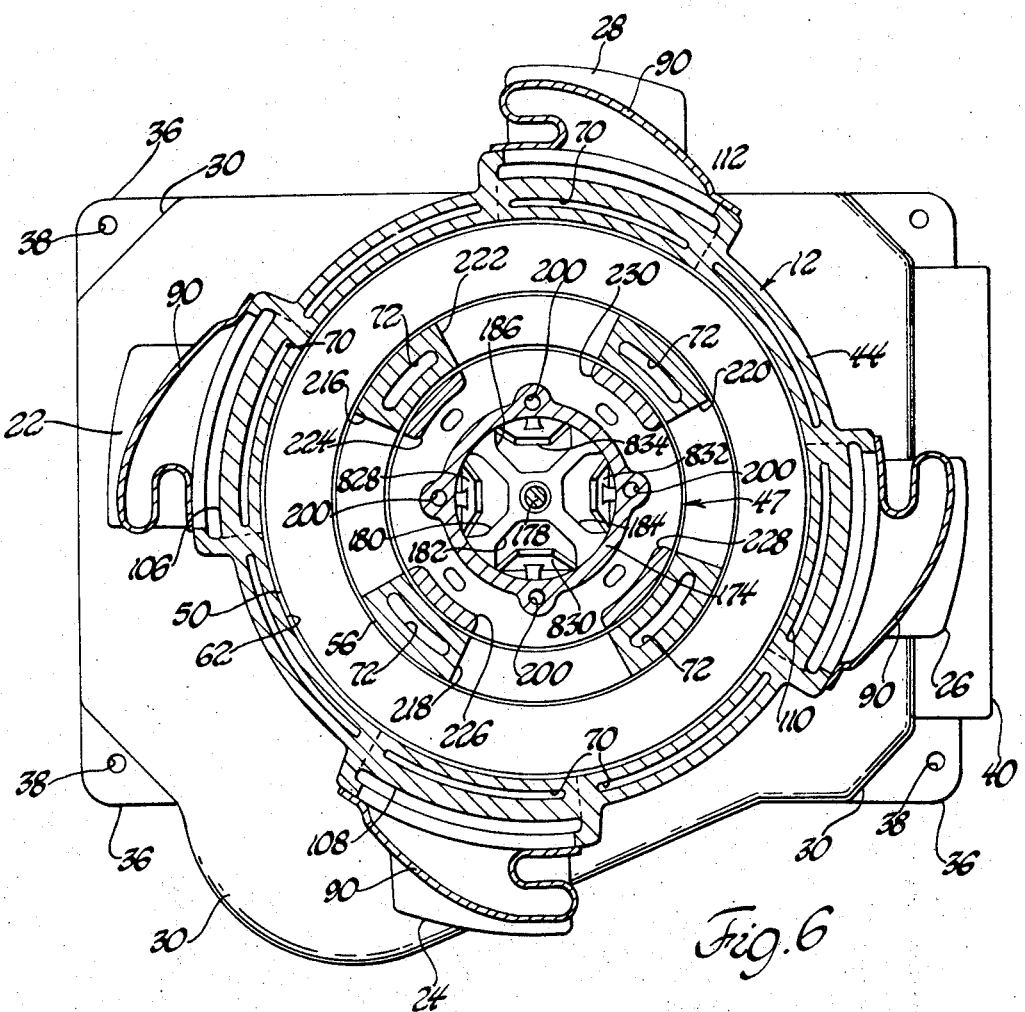
FIG. 6 is a cross-sectional view of the engine taken generally on the plane of line 6—6 of FIG. 3 and looking in the direction of the arrows.
Figure 7:
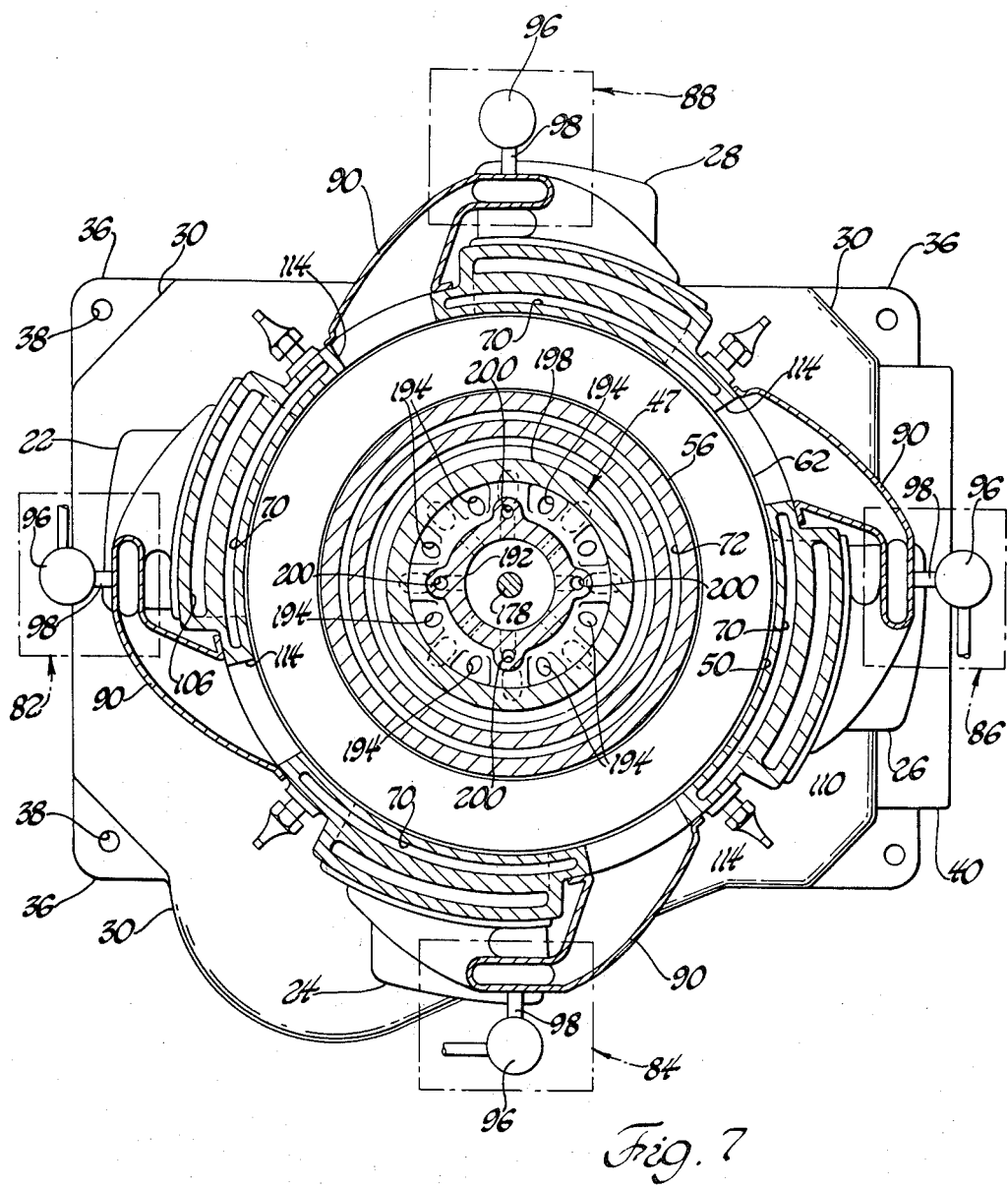
FIG. 7 is a cross-sectional view of the engine taken generally on the plane of line 7—7 of FIG. 2 and looking in the direction of the arrows.

Further inspection of, for example, FIGS. 3 and 6 will show that a lower disposed turbine shaft mounting structure 174 is generally peripherally carried by and internally of the turbine housing 47 and, in turn, as by a suitable bearing and seal assembly 176, supports one end of the turbine engine shaft 178. A plurality of passages 180, 182, 184 and 186 are formed through the mounting device 174 so as to have their respective lower ends in communication with the discharge chamber 188 of the compressor 42 (fixedly secured to the shaft 178) and their respective upper ends in communication with a chamber 190 formed generally within turbine housing 47 as by a generally tapered or conical wall portion 192. As illustrated in, for example, FIGS. 3, 6 and 7, the conical wall 192 has a plurality of apertures 194 formed therethrough which serve to complete communication between chamber 190 and the tapered annular chamber-like portion 196 between the outer wall 198 of housing 47 and the tapered or conical wall 192. Additionally, a plurality of conduits 200 are formed as to have their respective lower ends in communication with chamber 190 and their upper ends communicating with chamber 196. The turbine shaft 178, drivingly connected to a power turbine wheel 202, is journalled at its upper end as by a seal and bearing assembly 204 carried by an extension-like support 206 secured to the upper end of conical wall 192. As is well known in the art, a suitable power turbine stator stage 208 is preferably provided upstream of the power turbine wheel 202. A conically expanding turbine exhaust conduit 210 is suitably secured as to the outer bearing support member 66.

A compressor inlet assembly 212 secured to and carried by lower bearing support 76 so as to complete communication between the compressor 42 and an air supply conduit 214 which has an external air inlet 40.

The inner wall 56 of the piston housing 44 has a plurality of exhaust passages 216, 218, 220 and 222 which, as will become more evident as the description progresses, effecively communicate with a plurality of passages 224, 226, 228 and 230 formed at the lower end of chamber 196.

Figure 4:
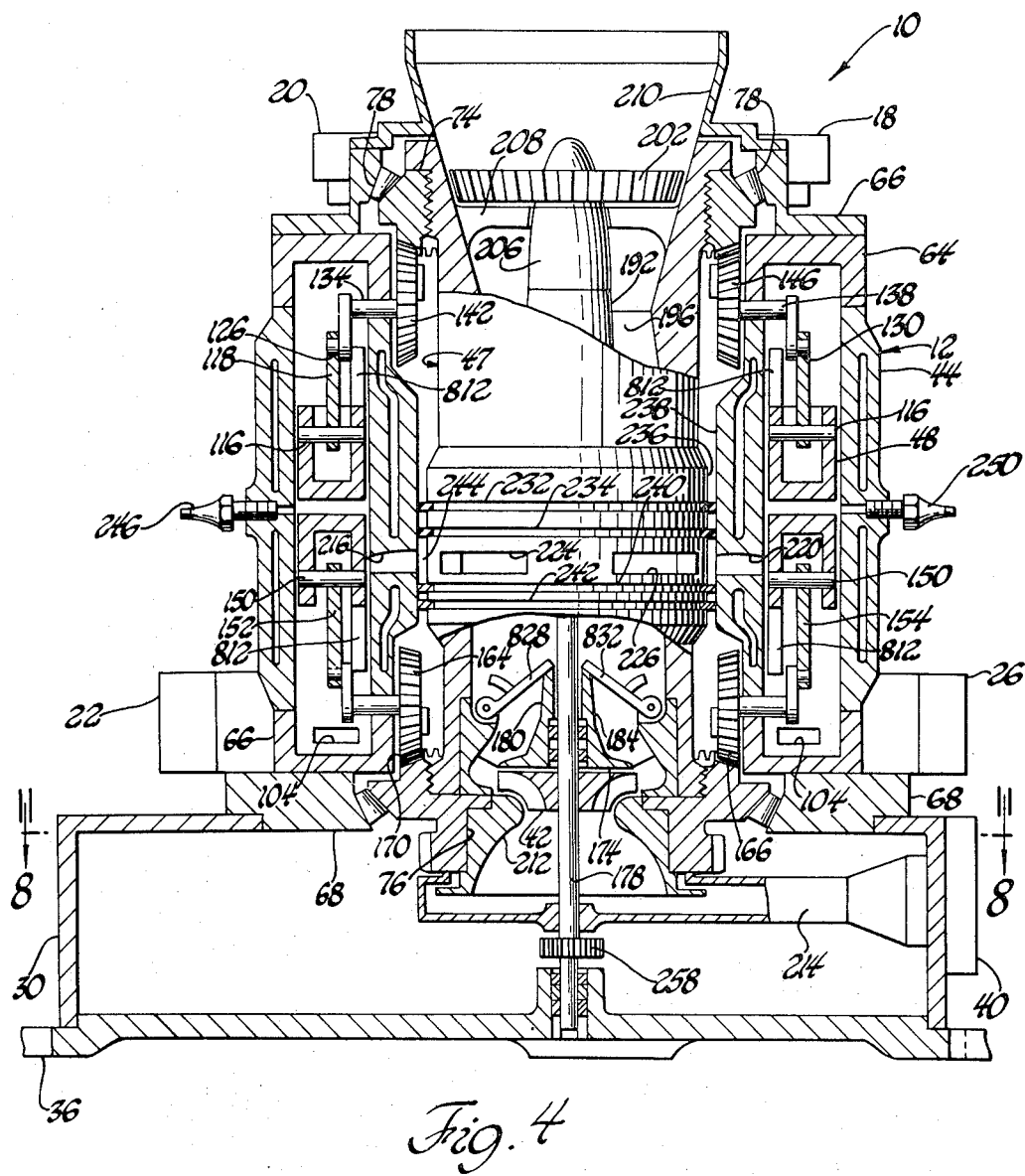
FIG. 4 is a generally axial cross-sectional view, with portions thereof shown in elevation, taken generally on the plane of line 4—4 of FIG. 1 and looking in the direction of the arrows.

As best seen in FIG. 4, a plurality of annular seals 232 and 234 are placed generally about the outer surface 236 of the turbine housing 47 and the inner surface 238 of the piston housing 44 in a manner as to be disposed generally above the conduit portions 224, 226, 228 and 230 as well as piston exhaust conduits 216, 218, 220 and 222. A second plurality of annular seals 240 and 242 are similarly situated except that seals 240 and 242 are situated as to be disposed generally below conduit portions 224, 226, 228 and 230 as well as piston exhaust conduits 216, 218, 220 and 222. Consequently, as shown in FIG. 4, an annular chamber or space 244 is defined generally by and between outer wall 236, inner wall 238 and seals 234 and 240. Therefore, even when turbine housing 47 is revolving with respect to piston housing 44, communication is continually maintained as between piston exhaust conduits 216, 218, 220 and 222 and turbine housing conduit portions 224, 226, 228 and 230 via annular chamber 244 which functions as a plenum chamber.

A plurality of conventional spark plugs or other suitable spark generating devices 246, 248, 250 and 252 are carried by the piston housing 44 and located so as to be in proper position for causing ignition of the combustible mixture when such mixture is compressed to a maximum degree as depicted in FIG. 4. As is well known in the art, the spark generating devices 246, 248, 250 and 252 may be connected to any suitable ignition timing device, not shown, which would be effective for causing an ignition spark to simultaneously occur at each of the spark generating devices in timed relationship to the operation of the pistons 48 and 50.

Figure 8:
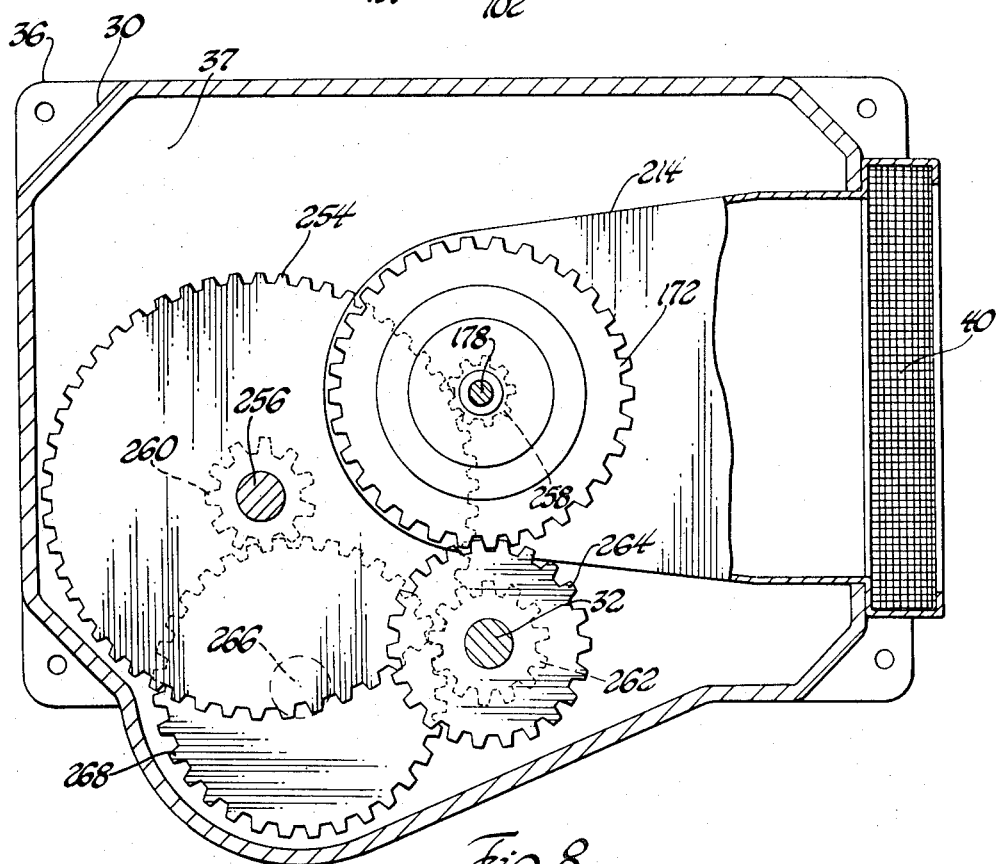
FIG. 8 is a cross-sectional view of the engine taken generally on the plane of line 8—8 of FIG. 4 and looking in the direction of the arrows.

As shown in both FIGS. 3 and 8, gear train means, situated generally within housing 30 (the positions of the gears in FIG. 3 being, for purposes of clarity, rotated out of position as shown in FIG. 8), comprises a first relatively large gear 254 (which may be considered as a flywheel, fixedly mounted on a shaft 256 journalled as within the lower housing plate or cover 37, in meshed engagement with a drive or pinion gear 258 fixedly secured to turbine shaft 178. A second smaller gear 260 is also fixed to shaft 256 as to thereby rotate in unison with the large gear 254.

The output shaft 32, illustrated as being journalled at its lower portion in bottom plate 37 and journalled at its upper end in support 68, has fixed thereto a relatively small gear 262 and a larger gear 264 which is in meshed engagement with gear portion 172. Finally, a shaft 266, which in FIG. 3 is shown partially behind shaft 32, journalled in the lower base number 37 carries a gear 268 which is in meshed engagement with gear 262.

Accordingly, in view of the above, it can be seen that one power train is defined generally by gear 258 driving the large gear 254 causing rotation of concentric gear 260 which, through gear 268, drives gear 262 and the output shaft 32 connected thereto. A second power train is defined generally by ring gear portion 172 drivingly rotating gear 264 and output shaft 32 secured thereto. In other words, as will become more evident from the following description, two power sources, namely the piston engine section and the turbine engine section, each apply or contribute their developed power to the same output shaft means 32.

OPERATION OF THE INVENTION

Although not shown, since it is believed that such is well known in the art, suitable engine cranking means such as an electric starter motor may be operatively connected to, for example, gear 254 so as to thereby provide power for cranking and starting the engine 10. Assuming that such a starter was operatively engaged with gear 254 and drivingly rotating it for cranking and starting purposes, it can be seen that such rotation of gear 254 would also result in the rotation of the turbine engine compressor 42, through gear 258 and shaft 178, as well as the rotation of the turbine housing 47 through the gear train described by gears 260, 268, 262 and 172 which, of course, ultimately results in the reciprocating movement of pistons 48 and 50. Such cranking would continue until the ignition devices succeeded in causing the pistons 48 and 50 to become self-sustaining in their reciprocating movements.

During operation of the engine 10, as should be apparent, pistons 48 and 50 are reciprocating within chamber 46 and, with each stroke, causing a partial vacuum or area of reduced pressure between the pistons and the respective upper and lower ends of piston chamber 46. Consequently, as pistons 48 and 50 move toward each other air is drawn into piston chamber 46 via upper air inlet assemblies 14, 16, 18 and 20 as well as lower air inlet assemblies 22, 24, 26 and 28. The relatively cold air thusly admitted fills not only the space between piston 48 and upper cover or head 64 and the space between piston 59 and lower head 66, but also fills the interconnecting passage means 106, 108, 110 and 112. The air thusly flowing in is terminated when pistons 48 and 50 have completed their compression stroke as depicted, for example, in FIG. 4. Upon ignition and expansion of the combustible mixture between pistons 48 and 50, the pistons start to move away from each other and toward opposite head members 64 and 66. In so doing the air contained between cover 64 and piston 48 as well as the air contained between cover 66 and piston 50 is forced through conduits or passages 106, 108, 110 and 112 and through respective induction passages 90 of the fuel supply devices 82, 84, 86 and 88. The air is not forced back out of the air inlet assemblies 14, 16, 18, 20, 22, 24, 26 and 28 because such inlet assemblies have in cooperation therewith, not shown but well known in the art, suitable one-way check valve means which permit flow of air into the engine but effectively prevent flow of air out of the engine through such inlet means.

As the air is thusly pumped through the induction passages 90, fuel is correspondingly metered from fuel reservoirs 96 into the air flow thereby creating a combustible mixture which, once piston 48 moves far enough to start to uncover ports 114, flows into piston chamber 46 between pistons 48 and 50. It should be noted that generally as piston 48 starts to uncover ports 114, piston 50 starts to uncover ports or exhaust passages 216, 218, 220 and 222 thereby permitting the incoming combustible mixture to sweep the combustion chamber between pistons 48 and 50. After the pistons 48 and 50 reach their maximum positions of their power stroke, as shown for example in FIG. 3, they again start to move toward each other in a compression stroke repeating the cycle as described above.

It should be apparent that as the pistons 48 and 50 reciprocate, the gears, such as gears 142, 146, 164 and 166 which are in meshed engagement with upper ring gear 168 and lower ring gear 170, cause corresponding rotation of the turbine housing 47 resulting in the power produced by pistons 48 and 50 being delivered to the output gear portion 172 the rotation of which, through the associated gear train, causes rotation of the turbine engine shaft 178.

As turbine shaft 178 is thusly rotated, compressor 42 accepts the air supplied by air inlet means 40 and conduit 214, and compresses such air which leaves the compressor 42 and after passing through passages 180, 182, 184 and 186, enters chamber 190 from where it passes through both apertures 194 and conduit portions 200 finally exiting into annular chamber 196. The air thusly delivered by the compressor 42 ultimately to chamber 196 is mixed with the very hot exhaust passages 216, 218, 220 and 222. That is, referring again to the operation of the pistons 48 and 50, it can be seen that chamber 46, between pistons 48 and 50 is purposely placed in very close proximity to the inlets 224, 226, 228 and 230 so that a minimum of temperature loss in the exhaust gases is experienced as between chamber 46 and chamber 196 of the turbine engine housing 47. Because of the very high temperatures and heat content of such exhaust gases, the exhaust gases can provide for the further expansion of the air supplied by compressor 42 to chamber 196.

As is usually the case with piston type engines, incomplete combustion of the fuel occurs. Accordingly, the very hot exhaust gas supplied to chamber 196 of the turbine housing contains unburned fuel (unburned only because of the unavailability of sufficient oxygen as well as possibly the insufficient time available for burning within the piston combustion chamber) which is then permitted to burn in the presence of the air, supplied by compressor 42, within chamber 196. Such additional burning of the available fuel causes still further expansion of the air and resulting gas within chamber 196 which, in turn passes through the turbine stator section 208 and power turbine wheel 202 causing driving rotation of the turbine wheel 202. A portion of the power thusly developed by the turbine wheel 202 is absorbed by the compressor 42. However, the remainder of the power developed by turbine wheel 202 is delivered via turbine shaft 178 to the turbine power output gear 258 fixedly secured to shaft 178.

SECOND EMBODIMENT OF THE INVENTION

FIGS. 9-14 illustrate a second embodiment of the invention which as shown, for example, in FIG. 9 is comprised of a main engine block or body 280 of a generally annular configuration having an annular passage or chamber 282 formed therethrough for the reception therein of an annular or ring-like piston 284 which, in turn, is connected for reciprocating movement through a plurality of wrist pins 286 and connecting rods 288, 290 to spaced parallel crankshafts 292 and 294.

Figure 12:
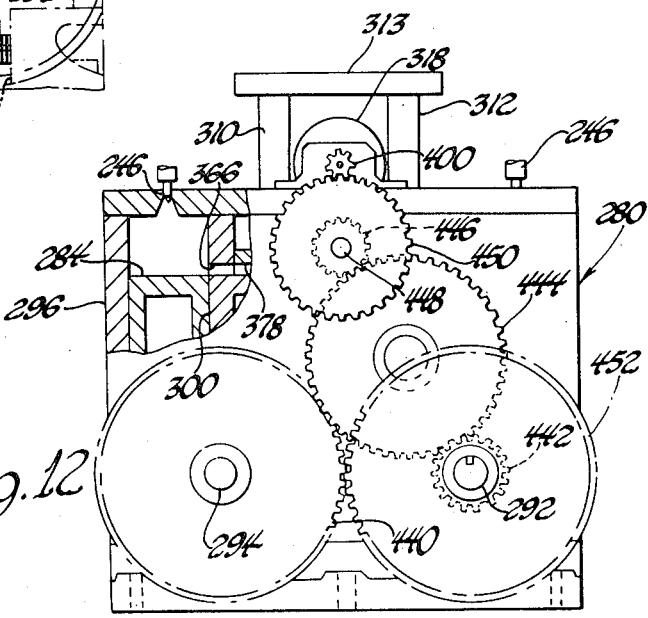
FIG. 12 is a view, partly in elevation and partly broken away and in cross-section, taken generally on the plane of line 12—12 of FIG. 9 and looking in the direction of the arrows.

The engine block 280 includes an outer wall 296 through which a plurality of induction passages 298 are formed similar to passages 110 of, for example, FIG. 3. A generally tubular inner wall 300 of engine housing 280 has a transverse wall section 302 formed therein with two spaced passages 306 formed therethrough, for the respective reception of air conduits 310 and 312, and a third passage 314 with a suitable valve seat 316 formed thereabout. The upper ends of conduits 310 and 312 may be in communication with a common air intake plenum and filter assembly 313 as shown in FIGS. 9 and 12.

The upper end of the engine housing 280 may be closed as by portions of the housing 318 comprising the related turbine engine section or assembly 320, while the lower end of engine housing 280 may be generally closed as by a housing section 322.

As can best be seen in FIG. 9, the lower housing section 322 has a cylinder 324 formed therein within which is situated a disc-like piston 326, which may include a suitable ring seal 328, operatively connected as at spaced supports 330 and 332 to crank throws 334 and 336 as by means of pivotal connecting arms 338, 340. As can be seen and as will be more apparent as the description progresses, the upper end of cylinder 324 is in communication with the lower open end of the inner tubular wall 300 as to thereby define a first variable but distinct pumping chamber 342 generally below piston 326 and a second variable but distinct pumping chamber 344 above piston 326 and below transverse wall 302.

An air intake assembly 346, which includes suitable one-way flow check valve means well known in the art, serves to supply air as from the ambient atmosphere to pumping chamber 324 as through conduit means 348. Second passage or conduit means 350, also including suitable one-way flow check valve means 352, serves to complete communication as between chamber 342 and the lower end of ring piston chamber 282. As with regard to the first embodiment disclosed, suitable fuel supply and metering means typically shown at 355 and functionally equivalent to either of the supply devices 82, 84, 86 or 88 of FIGS. 1 and 3, is arranged as to feed metered fuel at a controlled rate to the various induction passage means 298.

An air passage member 352, having a somewhat conical main body 354 with a corresponding passage 356 formed thereon, is situated generally centrally of the inner wall 300 in a manner as to have a transversely extending disc-like wall 358, integrally formed therewith, abut against the inner engine housing wall 300 shown, at a level generally below the level of a plurality of radially directed exhaust ports or passages 360, 362, 364 and 366 formed through the inner wall 300 of housing 280.

A lower depending portion 368 of the turbine housing 318 has an outer circumferential surface 370, closely received within the inner wall 300, and a plurality of radially directed slot like passages or recesses 372, 374, 376 and 378 which, as shown, when juxtaposed against the upper surface of transverse wall 358 form passageways communicating between the respective exhaust ports 360, 362, 364 and 366 and an inner somewhat spherical chamber 380. The upper end of housing 354, provided with a plurality of upwardly and outwardly radiating passages 382, extends into chamber 380 which, in turn, is in communication via aperture 383 with chamber 384 of turbine engine housing 318 upstream of the power turbine wheel 386.

As shown, the turbine wheel 386 is suitably fixedly carried by a turbine shaft 388 journaled as at 390, 392, 394, 396 and 398, which also carries a power output gear 400 at the end thereof. A suitable stator section 402, as is well known in the art, may be provided upstream of the turbine wheel 386.

As shown in FIGS. 9, 13, and 14, a timed valving mechanism 404 is situated generally within chamber 344 and is comprised of a main T-shaped body or carrier 406 hingedly supported as at 408 and 410 to transverse wall 302 and carrying first and second valve members 412 and 414, as on arms 416 and 418, which are so spaced as to be effective to at times close the lower ends of respective air conduits 310 and 312 thereby terminating communication between the air inlet 313 and chamber 344. A third valve 420, also carried by lever body 406, is so situated and positioned as to at times be effective for engaging seating surface 316 and thereby terminating communication between chamber 344 and passage 356.

A spring perch 422 secured as to wall 302 serves to carry a compression spring 424 which engages a tank portion 426 of lever body 406 thereby continually urging the carrier 406 clockwise (as viewed in either FIG. 9 or 13) about the pivot supports 408 and 410. However, as shown in FIGS. 9, 13 and 14, crankshafts 294 and 292 are respectively provided with actuating cams 428 and 430 which, in timed relationship to engine operation, engage cam followers 432 and 434 causing the carrier 406 to rotate counter-clockwise about pivots 408 and 410 thereby opening communication from chamber 344 to conduit 356 and terminating communication as between conduits 310, 312 and chamber 344.

As illustrated in FIGS. 9 and 10, the respective one ends of crankshafts 294 and 292 are preferably provided with counter-balanced flywheels 436 and 438 while the opposite ends of crankshafts 294 and 292 are respectively secured to output gears 440 and 442. Referring to each of FIGS. 9, 10, 11 and 12, gear 442 is in meshed engagement with an intermediate idler gear 444 which, in turn, is in meshed engagement with a relatively small gear 446 secured to a journalled shaft 448 which also fixedly carries thereon a second larger gear 450. As seen in both FIGS. 9 and 12, the larger gear 450 is in meshed engagement with the turbine output gear 400.

Figure 11:
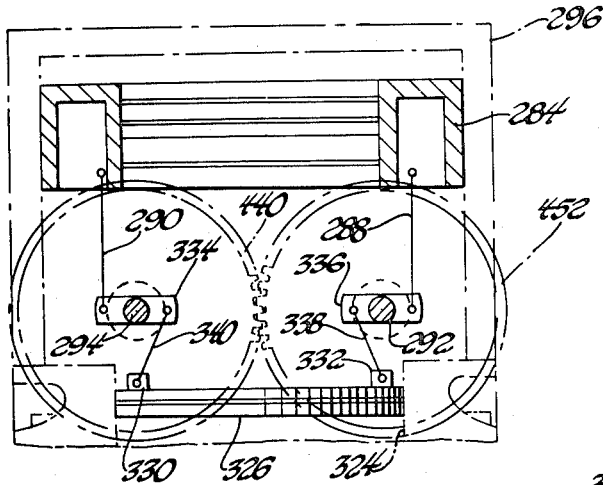
FIG. 11 is a somewhat schematic representation of selected elements of the second embodiment as possibly viewed on the plane of line 11—11 of FIG. 9 and looking in the direction of the arrows.

A second larger gear 452 is operatively secured to the crankshaft 292 and, as shown in FIGS. 10, 11 and 12, is in meshed engagement with gear 440.

Accordingly, if portion 454 of crankshaft 292 is considered as the power output shaft of the engine, it can be seen that basically two power trains exist. For example, a first power train is comprised of crankshafts 294, 292, and meshed gears 440, 452 which directly supply the power generated by the ring piston 284 to the output shaft 454, while the second power train is comprised of turbine output gear 400 in meshed engagement with gear 450 which through shaft 448 drives gear 446 in turn rotating idler gear 444 and thereby rotating gear 442 and gear 452 through common shaft 292. In view of the preceding, it can be seen that the power generated in each section of the overall engine is combined to a common output shaft 454.

OPERATION OF THE SECOND EMBODIMENT OF THE INVENTION

Before describing the operation, it should be, of course, apparent that (1) cranking of the engine could be accomplished, as is well known in the art, by an electric starter motor assembly engageable as with the gear 452 and (2) any suitable fuel metering and supply device or means could be employed for providing a rate of metered fuel flow to the engine in accordance with the power requirements thereof.

Once the engine is started the operation thereof is as follows. As cranks 294 and 292 rotate piston 284 is reciprocatingly raised and lowered within piston chamber 282 in accordance with crank rotation. At the same time the air pump 326, also connected to crankshafts 294 and 292, is reciprocatingly raised and lowered within cylinder 324 in accordance with crankshaft rotation.

Generally, every time that piston air pump 326 moves upwardly, air is drawn into chamber 342 through filtered air intake 346 and conduit 324 and when piston air pump 326 moves downwardly the air within chamber 342 is forced through check valve 350 and conduit means 348 into the lower end of ring piston chamber 282.

Also, as best seen in, for example, FIGS. 9, 11, and 13, every time the air pump 326 is in its upper position and starts to move downwardly, the crankshafts 292 and 294 will have rotated to a position wherein cams 430 and 428 permitted valve carrier 406 to rotate clockwise thereby moving valves 412 and 414 away from the ends of air conduits 310 and 312 while valve 420 has been moved to a closed position against seat 316 as shown in FIG. 13. Therefore, as piston air pump 326 continues to move downwardly, air is drawn into chamber 344 as by means of plenum air inlet 313 and conduits 310 and 312. However, as air pump 326 approaches its lowermost position, crankshafts 294 and 292 will have rotated suffciently to cause cams 430 and 428 to, through followers 434 and 432, rotate carrier 406 counter-clockwise to a degree causing valves 412 and 414 to be seated against the ends of conduits 310 and 312 thereby terminating further communication therethrough while moving valve 420 away from seat 316 thereby completing communication between chamber 344 and conduit 356 as shown in FIG. 9. When pump 326 starts its upward movement the air contained within chamber 344 is forced upwardly by pump 326 through conduit 356, conduits 382 and into chamber 380 where it is mixed with the hot exhaust gases flowing from ring piston chamber 282 through ports 360, 362, 364 and 366 and conduits or passages 372, 374, 376 and 378.

In view of the above, it can be seen that air pump 326 is double acting in that it supplies air to the ring piston chamber 282 below piston 284 and also supplies air to the spherical chamber 380 with such supplying of air to two different areas being accomplished during two different strokes of the pump cycle.

The timing of the crankshafts 294, 292 air pump piston 326 and power or ring piston 284 is such as to cause pump piston 326 to pump air into the lower end ring piston chamber 282 during the time that the crankshafts 292, 294 are moving the ring or power piston 282 upwardly in its compression stroke and to supply air to conduit 356 and chamber 380 during the time that power piston 284 is in its downward stroke.

Accordingly, the operation of the power piston 284 is generally as follows. With power or ring piston 284 starting from the lower-most position shown in FIG. 9 and moving upwardly the inlet ports of exhaust passages 360, 362, 364 and 366 as well as the discharge ports of induction passages 298 become closed by the piston 284 and the combustible mixture within annular chamber 282 above the piston 284 undergoes compression and ultimately ignition as by a plurality of ignition devices or spark plugs as typically illustrated at 246. Such ignition devices, if employed, as well as the associated ignition timing means and devices are well known in the art and form no part of this invention.

Upon ignition of the combustible mixture expansion of gases takes place causing piston 284 to move downwardly in a power stroke. As piston 284 so moves downwardly, the air previously supplied to the lower end of piston chamber 282 is pumped upwardly by ring piston 284 through the induction passages 298 and into the upper end of piston chamber 282. As the air is thusly pumped upwardly fuel is metered into the air stream as by suitable fuel supply means 355. The rate of air flow is of course controlled by suitable throttling means as generally schematically shown in FIG. 9 and as also discussed with reference to the embodiment of FIGS. 1–8. Further, when piston 284 has moved downwardly a sufficient distance, the exhaust ports 360, 362, 364 and 366 are uncovered thereby permitting the very hot exhaust gases to pass therethrough and passages 372, 374, 376 and 378 into chamber 380. When the power piston 284 reaches its lowermost position and starts upwardly the above-described cycle is repeated.

THIRD EMBODIMENT OF THE INVENTION

FIGS. 15, 16, 17 and 18 illustrate a third embodiment of the invention which may, in fact, be considered as a modification of the embodiment shown in FIGS. 9–14. For sake of brevity, all elements in FIGS. 15–18 which are like or similar to those of FIGS. 9–14 are identified with like reference numbers.

Figure 15:
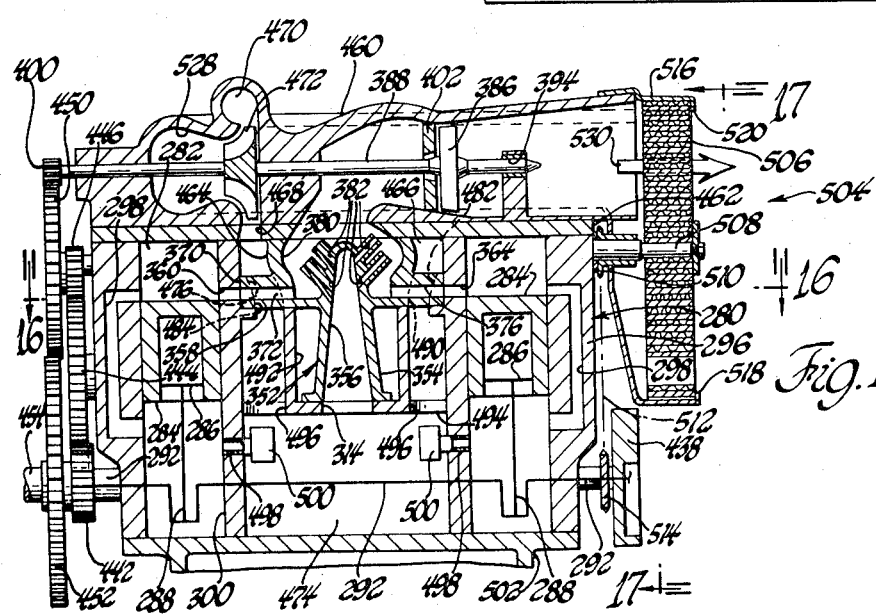
FIG. 15 is a view similar to FIG. 9 but illustrating a third embodiment of the invention.
Figure 16:
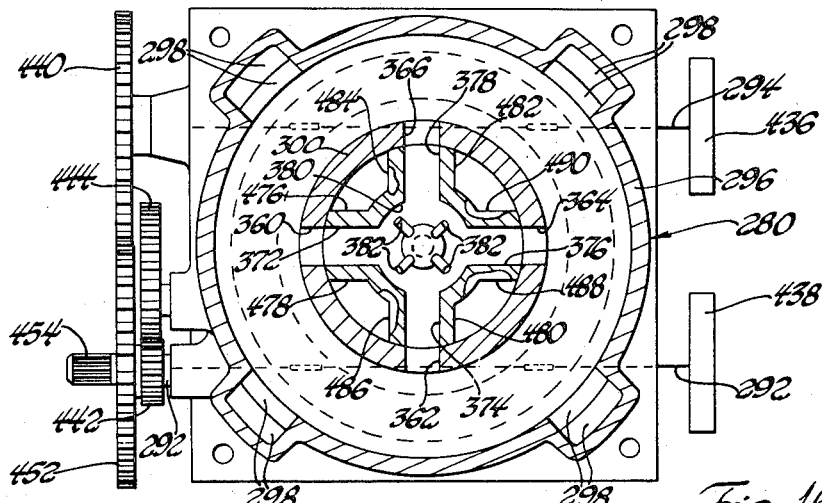
FIG. 16 is a cross-sectional view taken generally on the plane of line 16—16 of FIG. 15 and looking in the direction of the arrows.

In viewing FIG. 15, for example, it can be seen that the turbine engine housing 460 may be made separate from an intermediate end cover member 462 which may have an integrally formed depending portion 464 functionally similar to portion 368 of FIG. 9. Portion 464 includes an annular chamber 466 communicating at its upper end, via conduit portion 468, with the output chamber 470 of a compressor 472 fixedly secured as to the turbine shaft 388 and communicating at its lower with a chamber 474 via conduit portions or openings 476, 478, 480 and 482 formed in depending portion 464 and respectively aligned passage portions 484, 486, 488 and 490 in plate or wall 358. Clearances 476, 478, 480 and 482 are similar to apertures 309 and 311 of FIG. 10 in that such apertures permit the passage therethrough of air supply conduits 310 and 312.

Referring again to FIG. 15, it can be seen that structure 352 is generally supported by and contained in an annular mounting wall 492 which includes a transverse wall portion 494 with a plurality of apertures 496 formed therethrough. A plurality of air passage means comprised of conduit portions 498 and one way flow check valve assemblies 500 are situated as to provide a means whereby air can be supplied from chamber 474 to the lower end of piston chamber 282 but as to prevent the reverse flow of air from such chamber 282 to central chamber 474. The lower end of annular piston chamber 282 and the lower end of central chamber 474 may be closed as by an end cover member or plate 502.

Figure 17:
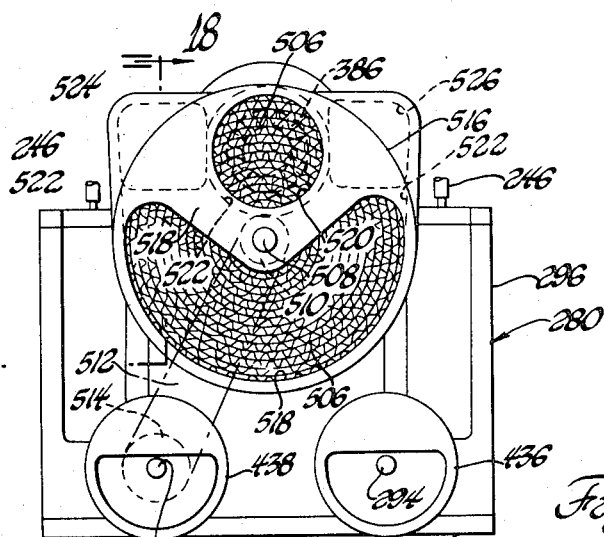
FIG. 17 is a cross-sectional view taken generally on the plane of line 17—17 of FIG. 15 and looking in the direction of the arrows.
Figure 18:
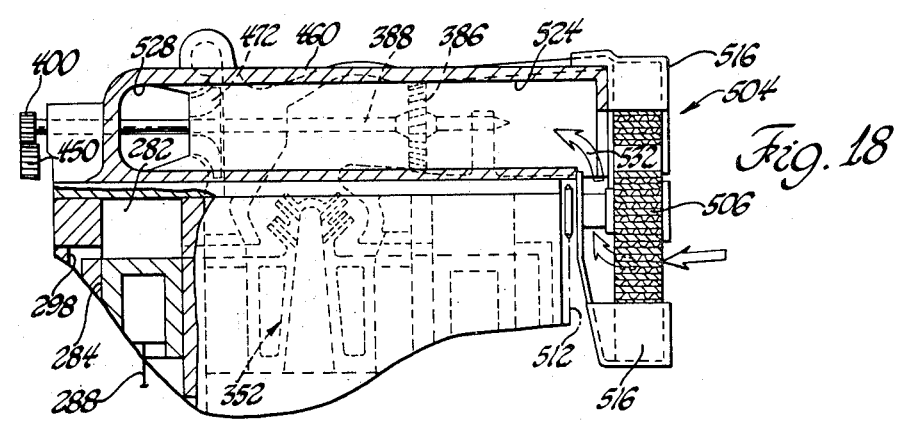
FIG. 18 is a fragmentary view partly in cross-section and partly in elevation taken generally on the plane of line 18—18 of FIG. 17 and looking in the direction of the arrows.

As also shown in FIGS. 15, 17 and 18, the engine is provided with a rotary type heat exchanger or regenerator assembly 504 which may be comprised of a main regenerator core 506 secured for rotation to a rotatable shaft 508 which, in turn, may be provided with a suitable gear portion 510 connected through suitable motion transmitting means 512 as to a second gear 514 carried by crankshaft 292.

The regenerator assembly 504 includes a suitable outer housing 516 in which are formed an inlet opening 518 and an outlet opening 520. As best seen in FIGS. 17 and 18, the housing 516 includes suitable directing as to have, for example, a common passage 522 leading from the inlet area to two spaced passageways or conduits 524 and 526 which, at their opposite ends, communicate with a generally medially disposed chamber 528 feeding the inlet of compressor 472.

As is well known in the art, the purpose of a regenerator assembly is to recover as much, as practical, the heat of a discharged fluid such as the turbine exhaust gases and transfer such recovered heat to, as in this instance, the cold incoming air. This is generally shown as by the arrow 530 in FIG. 15 depicting the hot turbine exhaust gases passing through the regenerator core 506 on its way to the ambient atmosphere, and by the arrows 532 of FIG. 18 depicting the passage of cold ambient air through the regenerator core 506 and through passage portion 522 to one of the longitudinal passages 524.

The manner in which heat is transferred from the hot exhaust gases to the cold inlet air is, of course, by the rotation of the core 506. That is, while the engine is running, the regenerator core 506 is being rotated as to thereby first expose a portion of the core 506 to the hot exhaust gases and then, through its continued rotation, present such heated portion of the core in the path of the incoming cold ambient air and thereby transfer its heat to such cold air.

OPERATION OF THE THIRD EMBODIMENT OF THE INVENTION

The operation of the embodiment or modification shown in FIGS. 15–18 is like that of the embodiment shown in FIGS. 9–14 in that the crankshafts 292 and 294 function to cause reciprocation of ring piston 284 and that piston 284 in so doing pumps air from the lower end of chamber 282 through the induction passages 298 to the upper end of piston chamber 282.

However, the manner in which air is supplied to the lower end of annular piston chamber 282 differs from that of FIG. 9 and is more like that of FIG. 3. That is, after the engine is started, cold air is drawn in through inlet 518 from where it passes through the regenerator core 506 and flows through duct 522 to and through passages 524, 526, into chamber 528 and the inlet of compressor 472 which then compresses the air and discharges such pressurized air into the discharge chamber 470. Conduit 468 serves to convey the pressurized air into annular chamber 466 from where it flows downwardly through passages 476, 478, 480 and 482 as well as aligned conduit portions or passages 484, 486, 488 and 490 and eventually into chamber 474 through passageways or clearances 496.

The air thusly forced into chamber 474 then flows in a plurality of directions the first of which is upwardly through conduit 356 and conduits 382 into the mixing or burning chamber 380. The other path or paths of travel of such air is from chamber 474 through check valve assemblies 500 and conduits 498 into the lower end of annular ring piston chamber 282. The reverse flow of air from the lower end of piston chamber 282 into central chamber 474 during the down stroke of piston means 284 is, of course, prevented by the check valve assemblies 500.

The power or gear train is, for purposes of illustration, shown to be like that of the embodiment in FIGS. 9-14.

FOURTH EMBODIMENT OF THE INVENTION

Figure 19:
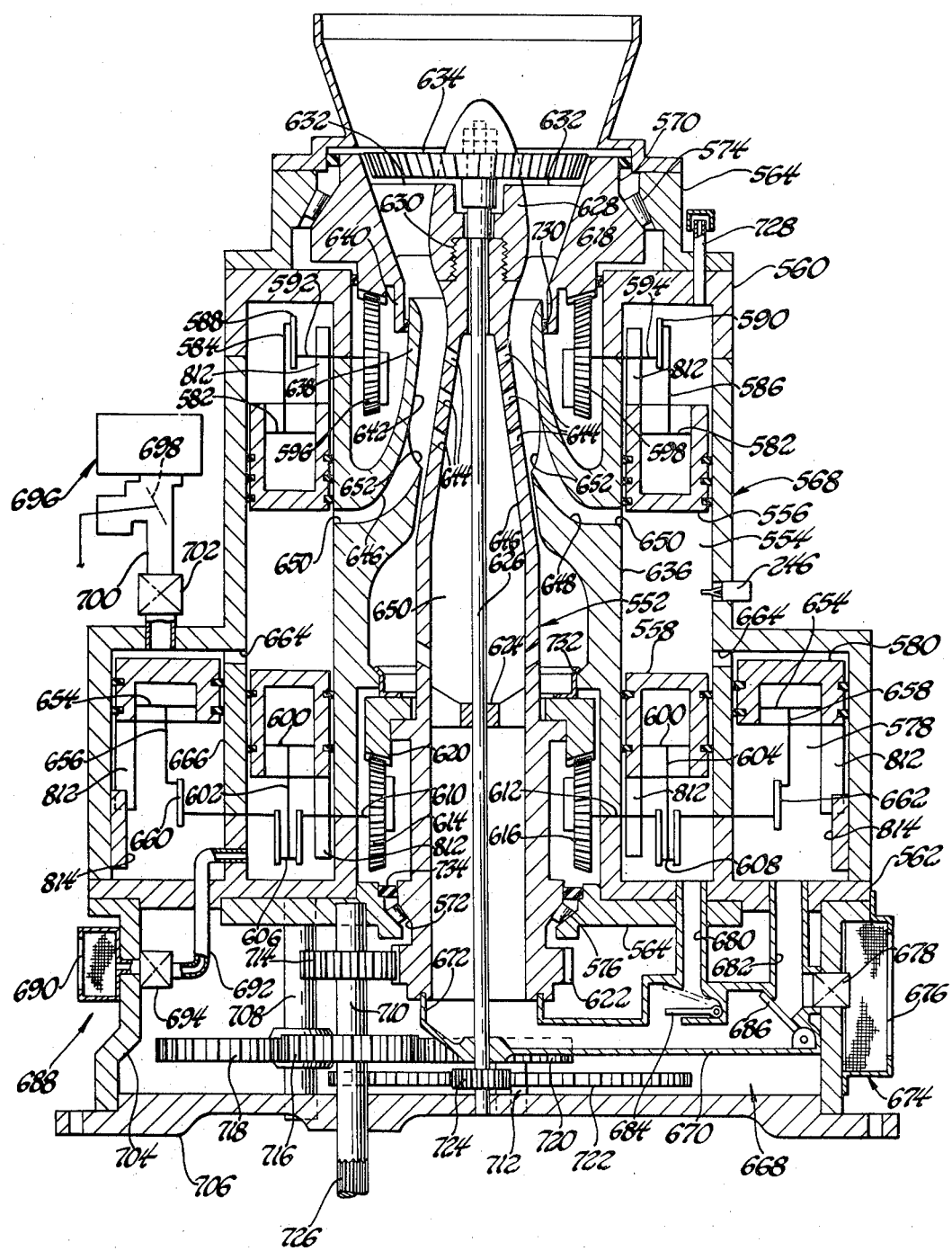
FIG. 19 is an axial cross-sectional view of a fourth embodiment of the invention.

Referring now in greater detail in FIG. 19, the fourth embodiment is illustrated as comprising a main housing or engine block 550 of a generally annular configuration so as to accommodate medially thereof a turbine engine housing 552. Engine housing 550 has an annular chamber or passage 554 formed therethrough for the reception therein of a plurality of ring-like pistons 556 and 558. Preferably both upper and lower ring pistons 556 and 558 are provided with inner and outer ring-like seals as shown at, for example, 52, 54, 58 and 60 of FIG. 3. The opposite ends of housing 550 may be closed as by annular upper and lower head or capping members 560 and 562 suitably secured in position to housing 550. Upper and lower bearing support members 564 and 566, the purpose of which will be subsequently described, are suitably secured to the overall housing assembly 568.

Generally, the turbine housing 552 may be suitably secured to or have formed at its opposite ends bearing support or race portions 570 and 572 which, respectively, cooperate with bearing supports 564 and 566 in rollingly containing therebetween bearings such as tapered roller bearings 574 and 576.

A second annular chamber 578 may be formed in engine housing 560 as to slideably receive therein a third ring-like piston 580 which, as will become evident, serves as an air pump.

Each of the pistons is connected as by means of a plurality of cranks to respective bevel gears. For example, piston 556 has a plurality of wrist pins 582 (two of which are shown) which are respectively connected to connecting rods 584 and 586. The respective upper ends of such connecting rods are, in turn, connected to eccentric journals 588 and 590 operatively connected to shafts 592 and 594 in turn drivingly connected to bevel gears 596 and 598.

Similarly, the lower power piston 558 has a plurality of wrist pins 600 (two of which are shown) which are respectively connected to connecting rods 602 and 604. The respective lower ends of such connecting rods are, in turn, connected to eccentric journals 606 and 608 of crankshafts 610 and 612 of bevel gears 614 and 616. Although only two wrist pins, connecting rods and crankshafts have been shown for each of the power pistons 556 and 558, it should be made clear that in the preferred form of the invention of FIG. 19, there would be a greater number of such elements corresponding to, for example, the number of such elements as shown in the first embodiment in order to better distribute the loading forces incurred when the pistons are in their power strokes.

The upper bevel gears, as illustrated by gears 596 and 598, are in meshed engagement with a co-acting ring gear portion 618 which may be formed on the bearing support portion 570 while the lower bevel gears, as illustrated by gears 614 and 616, are in meshed engagement with a co-acting ring gear portion 620 secured to turbine housing 552 for rotation therewith. As can be appreciated, reciprocation of power pistons 556 and 558 causes rotation of the upper and lower bevel gears which, in turn, drivingly rotate the turbine housing 552 with the result that an output driving rotation is produced at a gear portion 622 formed at the lower end of turbine housing 552.

The turbine housing 552 is provided with an intermediately located bearing support 624 for journalling turbine shaft 626, as well as a second shaft bearing support portion 628 which, as illustrated, may be threadably secured to the upper end 630 of turbine housing 552 (and if desired keyed thereto) and formed integrally with outer bearing race portion 570 as through intermediate radiating ribs 632 which, as is well known in the art, may actually comprise a stator stage upstream of a power turbine wheel 634 suitably secured to shaft 626 for rotation therewith.

The inner annular wall 636 of engine block or housing 560 is formed with a generally tapering or conical portion 638 which has an upper end received in a depending tubular portion 640 of the bearing race structure 570. The major portion of the upper end of conical section 638 may define a general chamber or enlarged conduit portion 642 through which an axial section of the turbine housing 552 extends. As shown, a plurality of conduit or passage portions 644 are formed through the wall 646 of turbine housing 552 as to complete communication between the interior 650 of turbine housing 552 and chamber or conduit 644. The conical portion 638 is also provided with a plurality of conduits, two of which are shown at 646, 648, which have their first or inlet ends 650 in communication with piston chamber 554 while their second or outlet ends 652 are in communication with chamber or conduit 642.

Similarly to power pistons 556 and 558, air pump piston 580 is also provided with a plurality of wrist pins 654 which are respectively connected to connecting rods 656 and 658 the lower ends of which are connected to eccentrics 660 and 662 respectively carried by crankshafts 610 and 612. The upper end of air pump piston chamber 578 is placed on communication with the middle portion of power piston chamber 554 as by means of a plurality of ports or passages 664 formed through an intermediate annular wall portion 666. However, the lower end of air piston chamber 578 is placed in communication with a source of ambient atmosphere as by air inlet means 668 which may be comprised of a main conduit section 670 terminating at its left end in a circular configuration 672, communicating with one end of chamber 650 of turbine housing 552, and at its other end communicating with an air inlet 674 (which may include a suitable filter assembly 676) and a serially situated one way flow check valve assembly 678. As also shown, the lower ends of power piston chamber 554 and air piston chamber 578 are respectively placed in communication by branch conduits 680 and 682 which are, in turn, respectively provided with check valves 684 and 686 which, generally, operate in a manner whereby when, for example, check valve 684 is opened, check valve 686 is closed and vice versa.

As seen at the lower left of FIG. 19, the lower end of power piston chamber 554 is also placed in communication with the ambient atmosphere via inlet means 688 which comprises an inlet assembly 690 and conduit means 692 with a one way flow check valve assembly 694 situated serially therebetween.

A suitable fuel metering device, as, for example, a carbureting apparatus schematically illustrated at 696 and including a throttle valve 698 and induction passage 700 (a plurality of such fuel metering devices being preferred), is situated as to deliver a fuel-air mixture to the top or upper end of the air pump cylinder 578. Further, it is preferred that a suitable one way flow check valve assembly 702 be provided to positively prevent any blow-back, if such a carbureting device is employed, through the induction passage when the air piston 580 is in its upward stroke.

A gear box may be defined generally by the lower end cover 562, side wall 704 and bottom mounting plate 706. The gear box serves to contain shafts 708, 710 and 712 as well as a portion of turbine shaft 626. Further, as can be seen, shafts 708, 710 and 712 are each journalled in end mounting plate 706 and may, as indicated by shafts 708 and 710, be also journalled in bearing support 564.

Shaft 710 has two gears 714 and 716 secured thereto for rotation therewith, with gear 714 being in meshed engagement with gear portion 622 while gear 716 is in meshed engagement with an idler gear 718 carried by shaft 708. Shaft 712 has gears 720 and 722 fixedly secured thereto with gear 722 being in continuous meshed engagement with an output gear 724 secured to turbine shaft 626 while gear 720 is in mesh with the idler gear 718. Accordingly, it can be seen that a first power gear train is defined by turbine housing gear portion 622, gear 714, shaft 710 to the output shaft portion 726, while a second gear train is defined by the turbine shaft output gear 724, large gear 722, shaft 612 to gear 720, and to gear 716 and output shaft 726 through idler gear 718.

OPERATION OF THE FOURTH EMBODIMENT OF THE INVENTION

The operation of the power pistons 556 and 558 is generally like that previously described with reference to FIG. 3. That is, reciprocation of pistons 556 and 558 cause rotation of the turbine housing 552 through the action of the crankshafts and related bevel and ring gears. It should also be noted that as the lower power piston 558 moves upwardly in its compression stroke air is drawn into the lower end of piston chamber 554 through the air inlet means 688; during this time the check valve 684 controlling branch conduit 680 is closed permitting no air to enter piston chamber 554 through conduit 680. However, as the lower power piston 558 moves downwardly, the air previously supplied to the lower end of chamber 554, being unable to flow out of conduit means 692 of check valve 694, is forced out through branch conduit 680, past the now opened check valve 683, and in and through conduit means 670 to the interior of turbine housing chamber 650. In comparison, the upper end of piston chamber 554 above the upper power piston 556 may be vented to the atmosphere as by a breather-type passage 728.

As generally depicted, the crankshaft eccentrics of cranks 610 and 612 are so arranged as to result in the outer air pump piston 580 being at its upper-most point of its stroke when the lower power piston 558 is at its lowermost point in its stroke. Accordingly, when the air pump piston 580 moves downwardly, (if carbureting structures are employed) a combustible mixture of fuel and air is drawn in through the induction passage means 700 filling the space in the air piston chamber 578 above the piston 580. The air or fuel-air mixture thusly drawn in does not at this time flow through the ports 664 because as air piston 580 starts downwardly, the power piston 558 starts upwardly closing off the ports 664. Further, as air piston 580 moves downwardly, the air in chamber 478 below air piston 580 is expelled through branch conduit 682 and conduit 670 into interior chamber 650 of turbine housing 552. At this time check valve 686 is opened while check valve 684 is closed.

After air piston 580 reaches its lower-most point of its stroke and starts on its upward movement check valve 686 becomes closed and check valve 684 is opened. Further, the air or fuel-air mixture in chamber 578 above air piston 580 starts to be compressed which continues until such time as power piston 558 has moved downwardly a distance sufficient to open ports 664 thereby enabling the air piston 580 to pump the air or fuel-air mixture through ports 664 into power piston chamber 554 in the space between the upper and lower pistons 556 and 558.

When the upper piston 556 starts to move downwardly and the lower piston 558 starts to move upwardly the fuel-air mixture previously supplied therebetween undergoes compression and eventually is ignited as by a plurality of igniter means or spark plugs one of which is shown at 246.

When such combustion occurs, the upper piston 556 is, of course, at a point whereby it has closed ports 650 of passages 648, 646. Such ports 650 will, however, become opened when upper piston 556 has moved sufficiently in its power stroke to uncover ports 650 and when this happens the extremely hot exahust gases, resulting from the ignition between pistons 556 and 558, flow through ports 650, conduits 646, 648 and through conduit chamber 642 toward the stator section 632 and power turbine wheel 634. However, as previously described, a flow of air is constantly being supplied to the interior chamber 650 of turbine housing 552 and such air is forced out of, for example, passages 644 where it is mixed with the still very hot gases in conduit chamber 642 resulting in further burning of whatever fuel is available and unburned causing additional expansion of such gases. The expanded gases, including, possibly, an overabundance of air, then drives the power turbine wheel 634 resulting in power being supplied to the turbine output gear 724 via shaft 626.

It should also be noted that when the ports 650 are finally uncovered, the air piston pump 580 is in its upward stroke thereby causing sweeping action of the chamber 554 between pistons 556 and 558 in order to better and more completely remove the exhaust gases therefrom.

As generally depicted at 730, 732 and 734 suitable rotary type seals may be provided where desired.

FIFTH EMBODIMENT OF THE INVENTION

Figure 20:
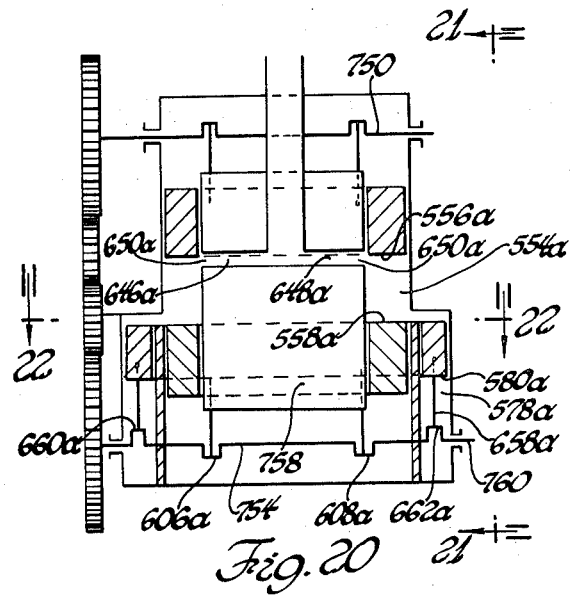
FIG. 20 is a generally schematic representation of a modification of the invention.
Figure 21:
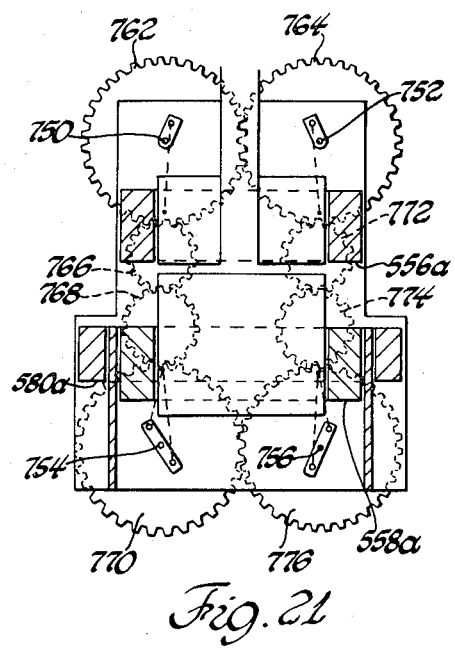
FIG. 21 is a view taken generally on the plane of line 21—21 of FIG. 20 and looking in the direction of the arrows.
Figure 22:
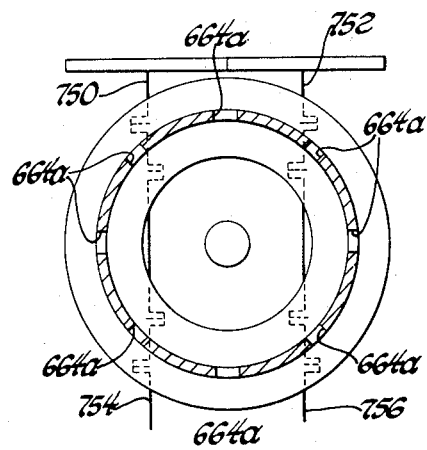
FIG. 22 is a cross-sectional view taken generally on the plane of line 22—22 of FIG. 20 and looking in the direction of the arrows.

FIGS. 20, 21 and 22 schematically illustrate a fifth embodiment of the invention. All elements which are like or similar to the preceeding Figures are identified with like reference numbers with a suffix "a".

Referring now in greater detail to FIGS. 20, 21 and 22, the power pistons 556a and 558a are functionally and operationally similar to pistons 556 and 558 of FIG. 19 except that piston 556a is connected to a first upper disposed pair of through-type crankshafts 750 and 752 while piston 558a is connected to a second lower disposed pair of through-type crankshafts 754 and 756. The medial portion, identified generally by 758 is merely a box representation of, for example, the turbine section 552 of FIG. 19.

The sole purpose of FIGS. 20, 21 and 22 is to illustrate the fact that the previous embodiments such as shown, for example, in FIGS. 3 and 19, may be modified to employ through type parallel crankshafts much in the manner that, for example, the embodiment of FIG. 9 employs parallel through-type crankshafts. It can be seen that the power produced by the pistons 556a and 558a is transmitted to, for example, an output shaft portion 760 as by means of a meshed gear system comprised of gears 762, 764, 766, 768, 770, 772, 774 and 776 with gears 762 and 764 being respectively secured to crankshafts 750 and 752, gears 770 and 776 being respectively secured to crankshafts 754 and 756 while gears 766 and 768 form an idler gear train between gears 762, 770 and gears 772 and 774 constitute an idler gear train between gears 764 and 776.

SIXTH EMBODIMENT OF THE INVENTION

Figure 23:
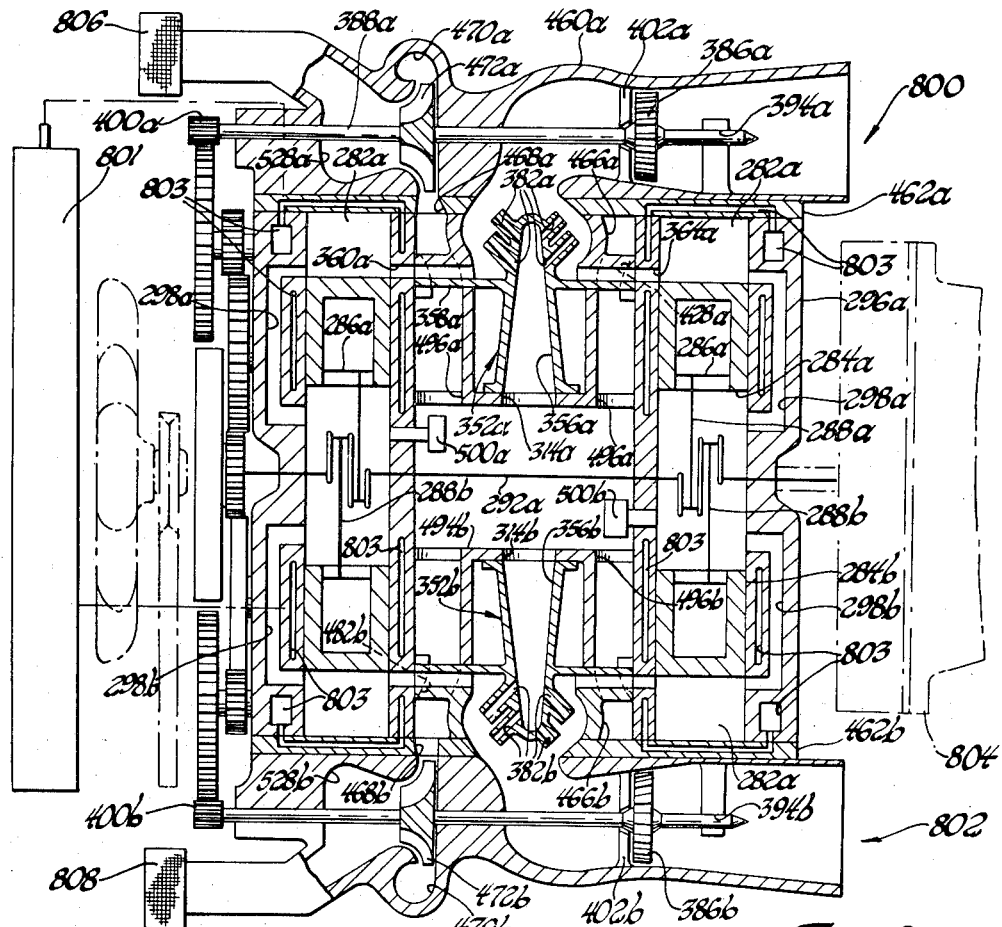
FIG. 23 is a generally axial cross-sectional view of a plurality of engines as shown, for example, in FIG. 15, operatively connected to each other to form a single power plant.

FIG. 23, basically, illustrates an arrangement whereby, for example, a pair of engines as depicted in FIG. 15 may be combined in generally opposed fashion to form a single prime mover or engine assembly for use as in automotive applications. In FIG. 23, all elements which are either like or similar to the elements of the embodiment of either FIG. 9 or FIG. 15 are identified with like reference numbers with a suffix "a" or "b" as the case may be.

From an inspection of FIG. 23 it can be seen that two engine sections 800 and 802, each functionally equivalent to the embodiment of FIG. 15, may be combined to employ common parallel crankshafts 292a and 294a which respectively lead to a gear box 804 which, in turn, as is well known in the art, may provide a common output shaft leading as to the vehicular transmission assembly (not shown). In such an arrangement, air intake assemblies 806 and 808 could be provided for and carried by the respective engine sections 800 and 802. As also indicated, if desired, a coolant radiator 801, as is well known in the art, may be operatively connected to suitable coolant passages 803 within the engine assembly while a cooling fan 805 may be driven as by belt means 807 connected in any suitable manner to any of the related output gears.

Figure 24:
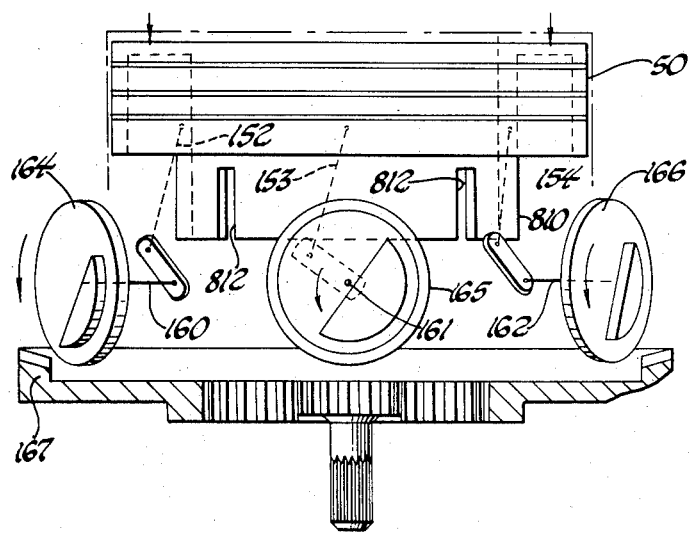
FIG. 24 is a partly elevational, partly schematic and partly cross-sectional view of certain elements shown in, for example, FIG. 3.

FIG. 24, partly in schematic and partly in pictorial, illustrates, for example, some of the bevel gears 164, 165 and 166 of FIG. 1 in running meshed engagement with the coacting bevel 167 which is functionally identical to bevel gear portion 170 of FIG. 1. As can be seen, a plurality of connecting rods, of which only 152, 153 and 154 are shown, are connected to the piston 50 and serve to rotate crankshafts 160, 161 and 162 with the bevel gears 164, 165 and 166 secured thereto.

As can be seen, the inner wall of the piston 50 is provided with a depending skirt-like portion 810 which may be provided with a plurality of elongated slots or keyways 812. The purpose of such keyways 812 is to slideably receive therein a fixed key portion typically shown 814 in, for example, FIG. 25. Such keying or guide means proves to be of benefit in embodiments such as shown in FIGS. 3 and 19 wherein segmented type of crankshafts are employed instead of the through type crankshafts as shown in, for example, FIGS. 9, 16 and 20. That is, in the embodiments of FIGS. 3 and 19, each time the power piston or pistons undergo a power stroke there is a tendency for such pistons to experience angular rotation or twisting about the axis thereof. Accordingly, such tendency can be effectively eliminated by the provision of such guide or keying means comprised of slots 812 and guide block or key 814 which may be suitably secured as to the inner wall of the engine block or housing. Of course, such keying means may also be employed in combination with the air piston pump as shown in FIG. 19.

Various other specific modifications are also contemplated. For example, FIGS. 25 and 26 illustrate a modified form of power piston 816 wherein the top or head surface is comprised of a first plurality of angularly spaced annular segmented surfaces 818 and a second plurality of angularly spaced annular segmented surfaces 820.

Figure 25:
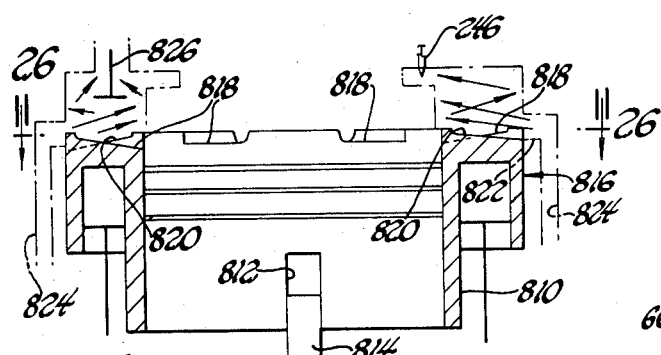
FIG. 25 is an axial cross-sectional view of a ring type piston employable within the engine of the invention.

As best shown in FIG. 25, the major portion of each of the surfaces 820 is inclined as to have the leading most or highest portion at the radially inner portion of the piston 816 while the major portion of each of the surfaces 818 is inclined in an opposite direction.

Figure 26:
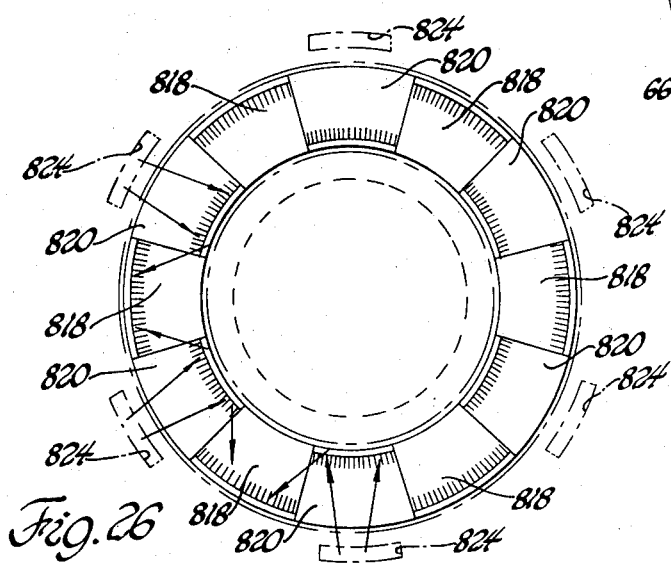
FIG. 26 is a top plan view taken generally on the plane of line 26—26 of FIG. 25 and looking in the direction of the arrows.

Further, as illustrated in FIG. 26, the surfaces 820 are arranged as to be in radial juxtaposition to respective inlets 822 of induction passages 824 while the surfaces 818 are preferably situated as to be in general alignment with exhaust ports whether such ports be of the valve operated type as shown at 826 or the side port type as depicted, for example, at 364 of FIG. 9.

The benefit of such inclined surfaces 818 and 820 is that as the piston 816 moves downwardly opening the inlet ports 822 from the induction passages 824, the flow of air (or air and fuel) impinges upon the surfaces 820 causing it to deflect upwardly and swirl in the combustion chamber (as generally illustrated by the inclined arrows) resulting in a more complete mixing of the combustible mixture as well as serving to better scavenge the combustion chamber of exhaust gases and send such gases out of the exhaust ports.

Further, as a precautionary measure, it is preferred that in the embodiment of FIG. 3, additional valving means be provided for use during the cranking and starting portion of engine operation. That is, referring to FIGS. 3, 4 and 6, a plurality of hinged valves 828, 830, 832 and 834 are provided in order to at times prevent flow from the interior of turbine housing 47 through passages 180, 182, 184 and 186 to conduit 214. That is, because of the position of valves 828, 830, 832 and 834, such valves will be in a downward position closing the respective passages 180, 182, 184 and 186 whenever the engine is shut down. During cranking and starting-up operations the speed of turbine wheel 202 may not be rotating fast enough thereby permitting the exhaust gases from pistons 48 and 50 to build up enough pressure as to flow out of the passages 180, 182, 184 and 186 and through the inlet conduit 214.

Accordingly, with the valves 828, 830, 832 and 834 in their closed positions when the engine is being started, all of the exhaust gas generated by the power pistons is forced upwardly through the turbine wheel 202 thereby assuring the turbine wheel of reaching operating speed as quickly as possible. Of course, when the turbine wheel reaches a design speed, the compressor 42 will provide sufficient pressure and flow to open, and maintain open, valves 828, 830, 832 and 834 for all subsequent conditions of engine operation.

GENERAL COMMENTS RELATING TO AND BENEFITS OF INVENTION

From the preceding it can be seen that each of the embodiments combines a piston engine section with a turbine engine section into an overall compound engine assembly and that the sections are so arranged as to have the exhaust ports of the piston engine section in very close proximity to the turbine engine section. By so doing the exhaust gases expelled by the piston engine section are held at their highest tmeperature with insignificant heat loss occurring before their entry into the turbine engine section. Further, as the air supplied by either the compressor of the turbine engine section or the related reciprocating air pump mixes with the very hot exhaust gases, further expansion of the thusly mixed air and gases takes place. This can often result because of an over-abundance of unburned fuel in the exhaust gas and in insufficient supply of oxygen which, in this invention, would be supplied by the air from the compressor or air pump. The expanding gases are then directed through the turbine wheel of the turbine engine section with extracts additional work energy therefrom.

Another important feature of the invention is the ability of the engine to minimize heat loss especially through the cylinder walls. This can best be understood by a comparison to the conventional internal combustion reciprocating piston engine.

Generally, a significant factor in heat transfer, in such engines, and therefore heat loss, is the amount of combustible gas volume contacting the cylinder walls during the process of combustion within the combustion chamber. The effective relationship between area of the combustion chamber and the volume of combustible gas enclosed within the cylinder walls is known as the "surface to volume ratio" (S/V) of the combustion chamber. As the surface area of the combustion chamber increases, the gases are exposed to a greater cooling area. However, the quantity of heat added for a given load and a given air-fuel ratio (A/F) depends on the amount of fuel introduced into the combustion chamber. The heat produced for a given amount of air-fuel mixture is utilized as work within the combustion chamber. It is also well known that the space or volume of the combustion chamber in which such heat is generated and confined is very important because part of such generated heat will be lost through the combustion chamber walls; the amount of such heat loss, in turn, depends on the S/V ratio. That is, the larger the S/V ratio the greater the heat loss will be through the cylinder walls. Therefore, the expected cooling of the gases within a particular combustion chamber is directly related to its surface-to-volume ratio, S/V.

However, the top or crown surface area of the piston is not included in the computations or calculations of the S/V ratio because such surface does not provide a direct path for heat conduction from the combustion chamber to the engine coolant or water jacket. Accordingly, with this in mind, the S/V ratio can be manipulated to the best advantage of reducing potential heat losses in the following manner.

As will become apparent, the S/V ratio between a smaller diameter piston and a larger diameter piston can be considerably different. As an example, let two different engines be considered wherein both the piston-diameter-to-stroke ratios and compression ratios of the engines are equal to each other but the first engine has a 3.0 inch bore and 3.0 inch stroke (with a compression gap of 0.67 inch at top dead center).

With regard to the first example, that being the 3.0 inch bore, it can be seen that the combustion chamber surface would be the area at the top of the cylinder plus the cylindrical wall area at top dead center piston position, or Surface = $(\pi \cdot D^2/4) + (2 \pi r \times 0.67)$ Where:
$\pi = 3.14$
$D = 3.0$ inches
$r = 1.50$ inches therefore: Surface area = 13.38 square inches. However, the volume of that combustion chamber would be:

Volume = $(\pi \cdot D^2/4) \times 0.67 = 4.74$ cubic inches.

The ratio of the above would be:
$S_1/V_1 = 13.38/4.74 = 2.82/1.00$

With regard to the second example, that being the 6.0 inch bore, it can be seen that the combustion chamber surface area ($S_2$) would be the area at the top of the cylinder plus the cylindrical wall area at top dead center piston position, or, $S_2 = \pi \cdot D^2/4 + (2 \pi r \times 1.34)$ Where:
$\pi = 3.14$
$D = 6.0$ inches
$r = 3.0$ inches therefore: the Surface area, $S_2$, = 53.54 square inches. However, the volume ($V_2$) of that combustion chamber would be:

$V_2 = (\pi \cdot D^2/4) \times 1.34 = 37.6$ cubic inches.

The ratio of the above would be:
$S_2/V_2 = 53.54/37.6 = 1.43/1.00$

The above two examples illustrate a striking difference between the respective surface to volume ratios. That is, it can be seen that the smaller cylinder has an approximate 100 percent greater surface to volume ratio than the other cylinder which is 100 percent larger in diameter.

Even though the 6.0 inch cylinder has a comparatively favorable surface to volume ratio it, nevertheless, can not as a practical matter be employed in automotive applications primarily because of the 6.0 inch stroke (or one close to it) which would have to be employed as a practical matter giving due consideration to feasible compression ratios.

In view of the above, the advantages of the ring-type piston and cylinder of the invention can now better be considered. Generally, the following will show that the ring piston and cylinder of the invention will provide a better surface to volume ratio while at the same time reducing the piston stroke from what would otherwise be required by the prior art.

In order to illustrate the above and better relate it to the first example of a 3.0 inch cylinder and piston, let the following be assumed:

1. $D_1 = 15.00$ inches = the outer diameter of the ring piston of the invention;
2. $D_2 = 12.00$ inches = the inner diameter of the ring piston of the invention;
3. $C.G. = 0.67$ inches = compression gap at top dead center of piston stroke;
4. $r_1 = \frac{1}{2} \times D_1 = 7.50$ inches
5. $r_2 = \frac{1}{2} \times D_2 = 6.00$ inches 6. stroke = 3.00 inches (same as in previous first example)

Therefore, the surface area ($s_3$) of the ring cylinder can be computed as follows:

$S_3 = (\pi \cdot D_1^2/4) - (\pi D_2^2/4) + [(2\pi\ r_1 - 2\pi\ r_2)(0.67)]$ $S_3 = 69.92$ square inches The volume of the combustion chamber can be calculated as follows:

$V_3 = [(\pi \cdot D_1^2/4 - (\pi \cdot D_2^2/4)](0.67) = 42.6$ cubic inches

Accordingly, in view of the above it can be seen that the surface to volume ratio of the ring cylinder of the invention is:

$S_3/V_3 = 69.92/42.6 = 1.63/1.00$

In comparing the value of $S_3/V_3$ to the value of $S_1/V_1$ it can be seen that the volume content was increased to 42.6 cubic inches while the surface area was reduced to 48.2 square inches and that there has been a 50 percent reduction in the surface to volume ratio.

According to the prior art, if one wanted to change the surface to volume (S/V) ratio substantially it was necessary to increase the piston diameter simultaneously with the piston stroke. As in the case of the second example considered (the 6.0 bore and 6.0 stroke engine) the S/V ratio was improved by about 45 percent by increasing the cylinder volume eight times and doubling the stroke.

Now, let it be assumed that a first engine having 3.0 inch bores and 3.0 stroke has a total of eight cylinders which, as a conventional engine, would have two explosions or ignitions occurring per revolution, and that such an engine were to be replaced by an engine of a single cylinder, of prior art design, having a volume equal to eight small cylinders of the first engine. Let these two engines be compared on an assumed operational speed of 6,000 R.P.M. of the smaller engine.

Accordingly, in order for the single large conventional piston engine to have an explosion volume equal to that produced by the eight cylinder engine, would have to run slower. That is, being of 4-cycle, the one large cylinder would have one working or power stroke for each two revolutions. For example, the small eight cylinder engine with two explosions per revolution would have, at 6,000 R.P.M., a working volume of: 12,000 × 4.75 cubic inch = 57,000 cubic inches whereas, the single large piston, having a volume eight times larger would have to undergo or attain an R.P.M. of only 3,030 R.P.M. in order to produce an equivalent working volume of 57,000 cubic inches.

Obviously, even though certain advantages are obtained with such a theoretical single large piston engine, it does not result in a desirable engine design especially when one considers that it would have one working stroke every second engine revolution.

However, with the ring type cylinder and piston of the invention, highly desirable characteristics are obtained. The following tabulated data (obtained from previous calculations) illustrates the comparison between the single 3.0 inch bore, 3.0 inch stroke cylinder of the first example to the single ring cylinder of the invention.

|  | Single 3.00 in. Cyl. | Single Ring Type Cyl. |
|---|---|---|
| Volume | 4.75 cu. in. | 42.6 cu.in. |
| Volume Increase |  | 9 times |
| S/V ratio | 2.22/1.00 | 1.63/1.00 |
| Stroke | 3.00 inches | 3.00 inches |
| Compression | Same | Same |

Since the single ring type cylinder, of the third example previously given, has a total volume of 42.6 cubic inches, which is approximately nine times the volume of one single 3.00 inch cylinder of the small eight cylinder engine, it should be obvious that the ring cylinder engine, in producing the same explosive volume would run proportionately slower. In addition, as shown by the preferred embodiments of the invention herein disclosed and described, it is preferable that the ring piston be employed as a 2-cycle engine instead of a 4-cycle engine.

Accordingly, in order for the single ring piston to produce a comparable power output, 57,000 cubic inches of combustible mixture has to be exploded in the ring cylinder every minute. However, if the ring piston is in a 2-cycle engine, each down stroke of the ring piston will be a power stroke. Therefore, in order to determine the engine R.P.M. of the ring piston engine the total of 57,000 cubic inches per minute has to be divided by 42.2 cubic inches per stroke (which is also per R.P.M) which results in 1,350.0 R.P.M. required for the single ring piston engine to produce the equivalent power.

In view of the above, it can be seen that the ring piston engine of the invention will produce the same power as the smaller diameter (3.0 inch) bore, eight cylinder engine but at a much slower engine speed. That is, the same power as was produced by the eight cylinder engine at 6,000.0 R.P.M. is produced by the ring piston engine at 1,350.0 R.P.M.

As a consequence of the above, additional benefits, relating to piston speed, are derived. In the conventional eight cylinder engine referred to, at an engine speed of 6,000.0 R.P.M., each piston has to travel twice the stroke for each engine revolution. Therefore, in such a prior art engine as assumed herein, the average piston speed would have to be 3,000.0 feet/minute while the average piston speed for the comparable ring piston of the invention, also traveling for each engine revolution twice the stroke, would only be 675.0 feet/minute. In other words, the comparable ring piston engine reduces piston speed by approximately 75 percent, reduces the surface to volume ratio (S/V) by over approximately 42 percent and yet produces the same power output.

Accordingly, in view of the above, it can be seen that the invention as herein disclosed provides a ring piston engine, whether of the single or double ring piston variety, which has a significantly improved surface to volume ratio and reduced piston speed which, especially when combined with an afterburner section or chamber, such as for example chamber 196 of FIG. 3, chamber 380 of FIG. 9 or chamber 642 of FIG. 19 for the continued burning of the exhaust gases, has performance characteristics unlike that of the prior art engines and is also effective for either totally or at least greatly inherently minimizing the production of air-polluting exhaust emissions.

Further, because of the fact that the ring piston engine of the invention does not experience as much heat loss through the cylinder wall as do the prior art multiple piston engines and because of the generally empty central core within the center of the annular cylinder, a further step forward in engine design is made possible. That is, such a centrally disposed core can be effectively utilized to provide means for extracting a substantial portion of the power remaining in the exhaust gases which, with prior art engine is wasted.

That is, as can be seen by the various embodiments of the invention disclosed, the ring piston exhaust gases are preferably exhausted radially through the inner wall of the annular cylinder from where they are directed to and enter a medially or centrally situated afterburner section. Such exhaust gases passing through the afterburner chamber experience enough of a time delay (delay in terms of reference to the time it would take such exhaust gases of the prior art engines to go to ambient atmosphere) to further propogate combustion. Further expansion of such exhaust gases results from the continued combustion and the expanding gases are directed to and through a power turbine section including a power turbine wheel which extracts energy from the expanding exhaust gases and delivers a power output as through an associated turbine shaft and output gear.

The efficiency of such a power turbine wheel can be increased by having, for example, the turbine shaft not only connected to the turbine wheel but also to a compressor, as illustratd for example in FIGS. 3 and 15, which serves to compress and furnish sufficient quantities of fresh or ambient air into the afterburner chamber where it mixes with the exhaust gases eminating from the annular cylinder. Such extra supply of air mixing with the exhaust gases serves first to lower the temperature of the exhaust gases thereby possibly saving wear and tear on the turbine wheel blades and also provides additional oxygen to the exhaust gases so that the additional combustion process of such exhaust gases will be prolonged while still in the afterburner chamber. Further, the added air stream flowing through the afterburner and turbine wheel generates, together with the exhaust gases, a more constant air or gas stream which is usually considered necessary for maximum turbine efficiency.

It is generally well known that the power conversion efficiency of internal combustion piston engines is less than 30 percent of available fuel energy. The exhaust, radiation and unaccounted "energy losses" in all instances average over 30 percent of such fuel energy.

However, with the above referred to turbine addition, it is theoretically possible to reclaim or extract a substantial amount of such energy as is represented by the 30 percent loss. The practical gain of reclaimed energy may be about a third of such 30 percent energy losses. However, in order to make a very conservative estimate and since friction losses for a piston engine are in the order of 10 percent, let it be assumed that the friction loss of the turbine system may be in the order of 15 percent. Therefore, the anticipated power gain would be:

(30 percent loss) × (⅓ gain/loss) = 10 percent gain in theoretical power output 10 percent − [1.5 percent turbine loss] = 8.5 percent actual gain in power output.

Further, as should be apparent, the invention, especially in the form employing the combination of ring piston and turbine sections, advances the art materially in the reduction of exhaust pollutants. That is, in the prior art engines, where the engine itself is directly involved in atmospheric pollution, the single largest source for such pollution is the unburned residual contaminants emitted with the exhaust gases. This type of pollution is an inherent characteristic of the combustion process taking place in the combustion chamber. That is, it is due to the "dissociation" which takes place within the chemical process of combustion.

At high temperatures as developed in the combustion chamber the products thereof tend to break-up or dissociate into other compounds such as, for example, carbon monoxide, water, lead oxide, nitrous oxide as well as acids of sulfur in an endothermic reaction. This, of course, results in a reduction in available energy. The impurities of the entire process are, in prior art engines, emitted through the exhaust manifold to the ambient atmosphere.

However, with the invention wherein the ring piston is employed in combination with an afterburner and turbine section, the prolonged burning of the exhaust gases not only extracts additional work energy but also effectively reduces the quantity of pollutants before the gases are exhausted to the atmosphere.

It should be evident that the above also takes care of burning such fuel, as is usually wasted by prior art engines, in the form of blow-down losses. Even if blow-down occurs in the engine of the invention such fuel is pumped into the afterburner chamber where it is burned as previously described.

Although only selected embodiments and modifications of the invention have been disclosed and described it should be apparent that other embodiments and modifications of the invention are possible within the scope of the appended claims.

I claim:

1. An internal combustion engine, comprising an engine housing, an annular cylinder formed in said housing, a ring-like piston received in said annular cylinder for reciprocating movement therein, motion transmitting means including a plurality of crank means angularly spaced from each other and operatively connected to said ring-like piston for transmitting the reciprocating movement of said ring-like piston to associated rotary power output means, exhaust port means formed in said housing for conveying exhaust gases from said annular cylinder generally radially inwardly of said annular cylinder, afterburner means situated generally radially inwardly of said annular cylinder and between said exhaust port means and the ambient atmosphere, and ambient air pumping means effective for supplying additional quantities of ambient air to said afterburner means in order to thereby mix said ambient air with said exhaust gases in said afterburner means, said afterburner means being effective to receive said exhaust gases from said exhaust port means and said ambient air supplied by said pumping means to further continue combustion of said exhaust gases within said afterburner means before discharging said exhaust gases to said ambient atmosphere.

2. An internal combustion engine according to claim 1, including a second ring-like piston received in said annular cylinder for reciprocating movement therein, and wherein said motion transmitting means is operatively connected to said second ring-like piston.

3. An internal combustion engine according to claim 1, wherein said ring-like piston comprises a radially outer annular wall and a radially inner annular wall, including keying means, said keying means comprising a first key portion formed by said radially inner annular wall of said ring-like piston, and a second key portion formed generally in said annular chamber for cooperating with said first key portion, said keying means being effective to prevent angular rotation of said ring-like piston about its centerline during said reciprocating movement.

4. An internal combustion engine according to claim 1, wherein said air pumping means comprises a reciprocating piston air pump operatively connected to said motion transmitting means for timed operation with respect to said ring-like piston.

5. An internal combustion engine according to claim 1, wherein said air pumping means comprises a double acting reciprocating piston air pump operatively connected to said motion transmitting means for timed operation with respect to said ring-like piston.

6. An internal combustion engine according to claim 1, wherein said air pumping means comprises a second ring-like reciprocating piston pump operatively connected to said motion transmitting means for timed operation with respect to said first mentioned ring-like piston.

7. An internal combustion engine according to claim 1, wherein said exhaust port means comprises a plurality of exhaust passages formed in said housing generally radially inwardly of said annular cylinder, including a plurality of inlet passages formed in said housing generally radially outwardly of said annular cylinder, said inlet passages being adapted for supplying combustion air to said annular cylinder, and wherein said ring-like piston includes a head surface area comprised of a plurality of angularly spaced first and second contoured surfaces alternately interspaced, said first contoured surfaces being so positioned as to be at times placed in general radial juxtaposition to said inlet passages, and said second contoured surfaces being so positioned as to be at times placed in general radial justaposition to said exhaust passages, and said first and second contoured surfaces having portions inclined generally oppositely to each other for enabling the combustion air entering said annular cylinder from said inlet passages to form swirl paths within said annular cylinder in order to thereby better scavenge the exhaust gases from said annular cylinder and into said exhaust passages.

8. An internal combustion engine according to claim 1, including a second ring-like piston received in said annular cylinder for reciprocating movement therein, wherein said motion transmitting means is operatively connected to said second ring-like piston, and wherein said motion transmitting means comprises a pair of rotary crankshafts arranged in parallel relationship to each other and generally between said first mentioned ring-like piston and said second ring-like piston.

9. An internal combustion engine according to claim 1, including a second ring-like piston received in said annular cylinder for reciprocating movement therein, wherein said motion transmitting means is operatively connected to said second ring-like piston, and wherein said motion transmitting means comprises a first pair of rotary crankshafts arranged in parallel relationship to each other and situated at one axial side of said first mentioned ring-like piston and a second pair of rotary crankshafts arranged in parallel relationship to each other and situated at an opposite axial side of said second ring-like piston.

10. An internal combustion engine according to claim 9, wherein said air pumping means comprises a third piston air pump operatively connected to said second pair of rotary crankshafts for actuation in accordance with the rotation thereof.

11. An internal combustion engine according to claim 10, wherein said third piston air pump comprises a third ring-like piston, and wherein said third ring-like piston is received within a second annular cylinder for reciprocating movement therein.

12. An internal combustion engine according to claim 1, wherein said motion transmitting means comprises a pair of parallel rotary crankshafts operatively connected to said ring-like piston.

13. An internal combustion engine, comprising an engine housing, an annular cylinder formed in said housing, a ring-like piston received in said annular cylinder for reciprocating movement therein, motion transmitting means including crank means operatively connected to said ring-like piston for transmitting the reciprocating movement of said ring-like piston to associated power output means, exhaust port means formed in said housing for conveying exhaust gases from said annular cylinder, afterburner means situated generally between said exhaust port means and the ambient atmosphere, said afterburner means being effective to receive said exhaust gases from said exhaust port means and to enable further continued combustion of said exhaust gases within said afterburner means before discharging said exhaust gases to said ambient atmosphere, said afterburner means comprising an afterburner chamber formed in a second generally tubular housing extending axially generally centrally of said annular cylinder, bearing means for journalling said tubular housing for rotation generally about its tubular axis, said motion transmitting means comprising a plurality of crankshafts each provided with a pinion-like gear thereon and each operatively connected to said ring-like piston, a ring gear portion operatively carried by said tubular housing for rotation therewith, each of said plurality of crankshafts extending generally radially of said tubular housing so as to have each of said pinion-like gears in meshed engagement with said ring gear portion for drivingly rotating said tubular housing in accordance with the reciprocating movement of said ring-like piston, and a ring-like output gear operatively carried by said tubular housing for conveying output power produced by said ring-like piston to said associated power output means.

14. An internal combustion engine, comprising an engine housing, an annular cylinder formed in said housing, a ring-like piston received in said annular cylinder for reciprocating movement therein, motion transmitting means including crank means operatively connected to said ring-like piston for transmitting the reciprocating movement of said ring-like piston to associated power output means, exhaust port means formed in said housing for conveying exhaust gases from said annular cylinder, afterburner means situated generally between said exhaust port means and the ambient atmosphere, said afterburner means being effective to receive said exhaust gases from said exhaust port means and to enable further continued combustion of said exhaust gases within said afterburner means before discharging said exhaust gases to said ambient atmosphere, said afterburner means comprising an afterburner chamber at least partly formed by a second generally tubular housing extending axially generally centrally of said annular cylinder, said tubular housing being adapted for rotation generally about its tubular axis and comprising a portion of said motion transmitting means, and power output conveying means operatively connected to said tubular housing and said ring-like piston for conveying output power produced by said ring-like piston to said associated power output means.

15. An internal combustion engine according to claim 14, and further comprising a second ring-like piston received in said annular cylinder for reciprocating movement therein, and wherein said motion transmitting means is operatively connected to said second ring-like piston.

16. An internal combustion engine according to claim 14, and further comprising ambient air pumping means effective for supplying additional quantities of ambient air to said afterburner chamber in order to mix said ambient air with said exhaust gases in said afterburner chamber, and wherein said afterburner chamber is effective to employ the oxygen within said additional quantity of ambient air to further combust said exhaust gases before discharging said exhaust gases to said ambient atmosphere.

17. An internal combustion engine according to claim 16, wherein said air pumping means comprises a reciprocating piston air pump operatively connected to said motion transmitting means for timed operation with respect to said ring-like piston.

18. An internal combustion engine according to claim 16, wherein said air pumping means comprises a double acting reciprocating piston air pump operatively connected to said motion transmitting means for timed operation with respect to said ring-like piston.

19. An internal combustion engine according to claim 16, wherein said air pumping means comprises a second ring-like reciprocating piston pump reciprocatingly received within a second annular cylinder formed within said engine housing generally concentrically with said first mentioned annular cylinder, said second ring-like piston pump being operatively connected to said motion transmitting means for timed operation with respect to said first mentioned ring-like piston.

20. An internal combustion engine according to claim 14, including a second ring-like piston received in said annular cylinder for reciprocating movement therein, wherein said motion transmitting means is operatively connected to said second ring-like piston, and wherein said motion transmitting means comprises at least a first pair of rotary crankshafts situated at one axial side of said first mentioned ring-like piston and operatively connected thereto, and at least a second pair of rotary crankshafts situated at an opposite axial side of said second ring-like piston and operatively connected thereto.

21. An internal combustion engine according to claim 20, wherein said air pumping means comprises a third piston air pump reciprocatingly received within a pumping cylinder and operatively connected to said second pair of rotary crankshafts for actuation in accordance with the rotation thereof.

22. An internal combustion engine according to claim 21, wherein said third piston air pump comprises a third ring-like piston, and wherein said pumping cylinder comprises a second annular cylinder in said engine housing for reciprocating movement therein of said third ring-like piston.

23. An internal combustion engine according to claim 21, and further comprising first and second variable but distinct pumping chambers in said cylinder respectively defined on opposite axial sides of said third piston, first passage means communicating between a source of said ambient atmosphere and said first pumping chamber, first check valve means in said first passage means effective to permit flow of ambient air from said source of ambient atmosphere to said first pumping chamber when said third piston is moving in a first direction resulting in an increase in the volume of said first pumping chamber but to prevent communication between said source and said first pumping chamber when said third piston is moving in a second direction resulting in a decrease in the volume of said first pumping chamber, second passage means communicating between said afterburner chamber and said first passage means, second check valve means for preventing flow from said second passage means to said first passage means when said third piston is moving in said first direction but enabling flow from said first passage means to said second passage means when said third piston is moving in said second direction, a third pumping chamber of variable volume defined in said first mentioned annular cylinder on one axial side of said second ring-like piston, third passage means communicating between said third pumping chamber and said source, third check valve means for permitting communication through said third passage means whenever said second ring-like piston is moving in a first direction resulting in an increase in the volume of said third pumping chamber while preventing such communication when said second ring-like piston is moving in a second direction resulting in a decrease in said volume of said third pumping chamber, and fourth passage means including fourth check valve means communicating between said third pumping chamber and said afterburner chamber, said fourth check valve means being effective to prevent communication through said fourth passage means when said second ring-like piston is moving in said first direction.

24. An internal combustion engine according to claim 23, wherein said second pumping chamber communicates with a source of combustible motive fluid and inlet passage means communicating with said annular cylinder at a point generally between said first and second ring-like pistons.

25. An internal combustion engine according to claim 14, and further comprising a pumping chamber of variable volume defined in said annular cylinder at one axial side of said ring-like piston, and a combustion chamber of variable volume also defined in said annular cylinder at an axial side of said ring-like piston opposite to said one axial side, first passage means communicating between a source of ambient atmosphere and said pumping chamber, first check valve means for preventing communication between said pumping chamber and said source of ambient atmosphere when said ring-like piston is moving in a first direction resulting in a decrease in said volume of said pumping chamber while permitting said communication when said ring-like piston is moving in a second direction resulting in an increase in said volume of said pumping chamber, and second passage means for transmitting said ambient air from said pumping chamber to said combustion chamber when said ring-like piston is moving in said first direction.

26. An internal combustion engine according to claim 25, and further comprising combustible motive fluid supply means, and wherein said second passage means communicates with said motive fluid supply means for supplying said motive fluid to said combustion chamber when said ring-like piston is moving in said first direction.

27. An internal combustion engine according to claim 25, and further comprising a second ring-like piston reciprocatingly situated in said annular cylinder as to have one axial end thereof defining a portion of said combustion chamber and an axial end opposite thereto at least partly defining a second pumping chamber of variable but distinct volume, third passage means communicating between said source of ambient atmosphere and said second pumping chamber, second check valve means effective to prevent communication through said third passage means and said second pumping chamber whenever said second ring-like piston is moving in a first direction resulting in a decrease of said volume of said second pumping chamber while permitting such communication when said second ring-like piston is moving in a second direction resulting in an increase in said volume of said second pumping chamber, and wherein said second passage means also communicates with said second pumping chamber.

28. An internal combustion engine according to claim 1, and further comprising a pumping chamber of variable volume defined in said annular cylinder at one axial side of said ring-like piston, and a combustion chamber of variable volume also defined in said annular cylinder at an axial side of said ring-like piston opposite to said one axial side, first passage means communicating between a source of ambient atmosphere and said pumping chamber, first check valve means for preventing communication between said pumping chamber and said source of ambient atmosphere when said ring-like piston is moving in a first direction resulting in a decrease in said volume of said pumping chamber while permitting said communication when said ring-like piston is moving in a second direction resulting in an increase in said volume of said pumping chamber, and second passage means for transmitting said ambient air from said pumping chamber to said combustion chamber when said ring-like piston is moving in said first direction.

29. An internal combustion engine according to claim 28, and further comprising combustible motive fluid supply means, and wherein said second passage means communicates with said motive fluid supply means for supplying said motive fluid to said combustion chamber when said ring-like piston is moving in said first direction.

30. An internal combustion engine according to claim 28, and further comprising a second ring-like piston reciprocatingly situated in said annular cylinder as to have one axial end thereof defining a portion of said combustion chamber and an axial end opposite thereto at least partly defining a second pumping chamber of variable but distinct volume, third passage means communicating between said source of ambient atmosphere and said second pumping chamber, second check valve means effective to prevent communication through said third passage means and said second pumping chamber whenever said second ring-like piston is moving in a first direction resulting in a decrease of said volume of said second pumping chamber while permitting such communication when said second ring-like piston is moving in a second direction resulting in an increase in said volume of said second pumping chamber, and wherein said second passage means also communicates with said second pumping chamber.

31. An internal combustion engine, comprising an engine housing, an annular cylinder including a combustion chamber formed in said housing, said annular cylinder comprising a first radially inner annular wall and a second radially outer annular wall, a ring-like piston received in said annular cylinder for reciprocating movement therein, motion transmitting means including crank means operatively connected to said ring-like piston for transmitting the reciprocating movement of said ring-like piston to associated power output means, afterburner means situated generally radially inwardly of said first inner annular wall and in communication with the ambient atmosphere, and a plurality of generally radially directed exhaust passages formed through said first inner annular wall and communicating between said combustion chamber and said afterburner means so as to thereby minimize heat loss through conduction and radiation through said second outer annular wall, said afterburner means being effective to receive said exhaust gases from said exhaust passages and to enable further continued combustion of said exhaust gases within said afterburner means before discharging said exhaust gases to said ambient atmosphere.

32. An internal combustion engine, comprising an engine housing, an annular cylinder including a combustion chamber formed in said housing, said annular cylinder comprising a first radially inner annular wall and a second radially outer annular wall, a ring-like piston received in said annular cylinder for reciprocating movement therein, motion transmitting means operatively connected to said ring-like piston for transmitting the reciprocating movement of said ring-like piston to associated power output means, afterburner means situated generally radially inwardly of said first inner annular wall and in communication with the ambient atmosphere, and exhaust passage means communicating between said combustion chamber and said radially inwardly situated afterburner means, said afterburner means being effective to receive said exhaust gases from said exhaust passage means and to enable further continued combustion of said exhaust gases within said afterburner means before discharging said exhaust gases to said ambient atmosphere.

33. An internal combustion engine according to claim 32, and further comprising a second ring-like piston received in said annular cylinder for reciprocating movement therein, and wherein said motion transmitting means is operatively connected to said second ring-like piston.

34. An internal combustion engine according to claim 32, and further comprising ambient air pumping means effective for supplying additional quantities of ambient air to said afterburner means in order to mix said ambient air with said exhaust gases in said afterburner means, and wherein said afterburner means is effective to employ the oxygen within said additional quantity of ambient air to further combust said exhaust gases before discharging said exhaust gases to said ambient atmosphere.

35. An internal combustion engine according to claim 34, wherein said air pumping means comprises a reciprocating piston air pump operatively connected to said motion transmitting means for timed operation with respect to said ring-like piston.

36. An internal combustion engine according to claim 34, wherein said air pumping means comprises a double acting reciprocating piston air pump operatively connected to said motion transmitting means for timed operation with respect to said ring-like piston.

37. An internal combustion engine according to claim 34, wherein said air pumping means comprises a second ring-like reciprocating piston pump reciprocatingly received within a second annular cylinder formed within said engine housing generally concentrically with said first mentioned annular cylinder, said second ring-like piston pump being operatively connected to said motion transmitting means for timed operation with respect to said first mentioned ring-like piston.

38. An internal combustion engine according to claim 32, including a second ring-like piston received in said annular cylinder for reciprocating movement therein, wherein said motion transmitting means is operatively connected to said second ring-like piston, and wherein said motion transmitting means comprises at least a first pair of rotary crankshafts situated at one axial side of said first mentioned ring-like piston and operatively connected thereto, and at least a second pair of rotary crankshafts situated at an opposite axial side of said second ring-like piston and operatively connected thereto.

39. An internal combustion engine according to claim 38, wherein said air pumping means comprises a third piston air pump reciprocatingly received within a pumping cylinder and operatively connected to said second pair of rotary crankshafts for actuation in accordance with the rotation thereof.

40. An internal combustion engine according to claim 39, wherein said third piston air pump comprises a third ring-like piston, and wherein said pumping cylinder comprises a second annular cylinder in said engine housing for reciprocating movement therein of said third ring-like piston.

41. An internal combustion engine according to claim 39, and further comprising first and second variable but distinct pumping chambers in said cylinder respectively defined on opposite axial sides of said third piston, first passage means communicating between a source of said ambient atmosphere and said first pumping chamber, first check valve means in said first passage means effective to permit flow of ambient air from said source of ambient atmosphere to said first pumping chamber when said third piston is moving in a first direction resulting in an increase in the volume of said first direction resulting in an increase in the volume of said first pumping chamber but to prevent communication between said source and said first pumping chamber when said third piston is moving in a second direction resulting in a decrease in the volume of said first pumping chamber, second passage means communicating between said afterburner means and said first passage means, second check valve means for preventing flow from said second passage means to said first passage means when said third piston is moving in said first direction but enabling flow from said first passage means to said second passage means when said third piston is moving in said second direction, a third pumping chamber of variable volume defined in said first mentioned annular cylinder on one axial side of said second ring-like piston, third passage means communicating between said third pumping chamber and said source, third check valve means for permitting communication through said third passage means whenever said second ring-like piston is moving in a first direction resulting in an increase in the volume of said third pumping chamber while preventing such communication when said second ring-like piston is moving in a second direction resulting in a decrease in said volume of said third pumping chamber, and fourth passage means including fourth check valve means communicating between said third pumping chamber and said afterburner means, said fourth check valve means being effective to prevent communication through said fourth passage means when said second ring-like piston is moving in said first direction.

42. An internal combustion engine according to claim 41, wherein said second pumping chamber communicates with a source of combustible motive fluid and inlet passage means communicating with said annular cylinder at a point generally between said first and second ring-like pistons.

43. An internal combustion engine according to claim 32 wherein said motion transmitting means comprises a pair of rotary crankshafts situated at one axial side of said ring-like piston and operatively connected thereto.

44. An internal combustion engine according to claim 32, wherein said afterburner means comprises an afterburner chamber with conduit means situated therein and communicating therewith, wherein said exhaust passage means is in communication with said afterburner chamber, and further comprising ambient air pumping means communicating with said conduit means situated within said afterburner chamber for supplying therethrough additional quantities of ambient air to said afterburner chamber in order to mix said ambient air with said exhaust gases in said afterburner chamber, and wherein said afterburner chamber is effective to employ the oxygen within said additional quantity of ambient air to further combust said exhaust gases before discharging said exhaust gases to said ambient atmosphere.

45. An internal combustion engine according to claim 32, and further comprising a second ring-like piston received in said annular cylinder for reciprocating movement therein, and wherein said motion transmitting means comprises crankshaft means situated generally between said first and second ring-like pistons and operatively connected thereto.

46. An internal combustion engine according to claim 45 and further comprising second afterburner means situated generally radially inwardly of said first inner annular wall and in communication with the ambient atmosphere, second exhaust passage means communicating between said second afterburner means and a second combustion chamber within said annular cylinder defined by said second ring-like piston, said second afterburner means being effective to receive exhaust gases from said second combustion chamber through said second exhaust passage means to enable further continued combustion within said second afterburner means of said exhaust gases from said second combustion chamber before discharge thereof to said ambient atmosphere.

* * * * *